United States Patent
Ishiguro et al.

(10) Patent No.: US 10,717,555 B2
(45) Date of Patent: Jul. 21, 2020

(54) BINDING MACHINE FOR GARDENING

(71) Applicant: MAX CO., LTD., Chuo-ku, Tokyo (JP)

(72) Inventors: Hiroki Ishiguro, Tokyo (JP); Susumu Hayashi, Tokyo (JP); Satoshi Taguchi, Tokyo (JP)

(73) Assignee: MAX CO., LTD., Tokyo (JP)

( * ) Notice: Subject to any disclaimer, the term of this patent is extended or adjusted under 35 U.S.C. 154(b) by 320 days.

(21) Appl. No.: 15/622,188

(22) Filed: Jun. 14, 2017

(65) Prior Publication Data
US 2017/0361959 A1 Dec. 21, 2017

(30) Foreign Application Priority Data
Jun. 15, 2016 (JP) .................................. 2016-119279

(51) Int. Cl.
*B65B 13/16* (2006.01)
*A01G 17/08* (2006.01)
(Continued)

(52) U.S. Cl.
CPC .............. *B65B 13/16* (2013.01); *A01G 17/08* (2013.01); *A01G 17/085* (2013.01);
(Continued)

(58) Field of Classification Search
CPC ....... B65B 13/025; B65B 13/04; B65B 13/16; B65B 13/183; B65B 13/327;
(Continued)

(56) References Cited

U.S. PATENT DOCUMENTS

| 5,954,899 A * | 9/1999 | Figiel | .................... B65B 13/327 |
| | | | 100/33 PB |
| 6,345,648 B1 * | 2/2002 | Cheung | .................... B65B 13/18 |
| | | | 140/93.2 |

(Continued)

FOREIGN PATENT DOCUMENTS

| CN | Y-201341351 | 11/2009 |
| EP | A1-2664233 | 11/2013 |

(Continued)

OTHER PUBLICATIONS

Extended European Search Report dated Nov. 8, 2017 in corresponding European patent application 17175947.5 (9 pages).

*Primary Examiner* — Adam J Eiseman
*Assistant Examiner* — Matthew Kresse
(74) *Attorney, Agent, or Firm* — Rothwell, Figg, Ernst & Manbeck, P.C.

(57) ABSTRACT

A binding machine for gardening includes a main handle, a clincher arm and a tape gripping device. The main handle is configured to draw out a tape. The clincher arm is provided such that an end portion side of the clincher arm is configured to be close to and be away from a tape guide. The tape gripping device is attached to the clincher arm and is configured to grip the tape drawn out from the main handle. The tape gripping device includes a support portion and a gripping member. The support portion is provided on the clincher arm. The gripping member is provided so as to face the support portion. The tape gripping device is configured to sandwich and grip the tape by the support portion and the gripping member.

10 Claims, 22 Drawing Sheets

(51) Int. Cl.
*B65B 13/02* (2006.01)
*B65B 13/34* (2006.01)
*B65B 13/04* (2006.01)

(52) U.S. Cl.
CPC .......... *B65B 13/025* (2013.01); *B65B 13/345* (2013.01); *B65B 13/04* (2013.01)

(58) Field of Classification Search
CPC ..... B65B 13/345; B65B 13/185; B65B 13/20; A01G 17/08; A01G 17/085; A01G 5/02; A01B 1/00
USPC .................. 100/16, 6, 33 PB, 33 R; 156/148; 47/1.01 R, 1.01 S
See application file for complete search history.

(56) References Cited

U.S. PATENT DOCUMENTS

| | | |
|---|---|---|
| 6,382,289 B1 | 5/2002 | Jho |
| 10,181,366 B2 * | 1/2019 | Houser .............. B65H 35/0026 |
| 2004/0237805 A1 | 12/2004 | Hayashi et al. |
| 2013/0125461 A1 | 5/2013 | Seo |
| 2015/0181810 A1 | 7/2015 | Cho |

FOREIGN PATENT DOCUMENTS

| | | |
|---|---|---|
| EP | A1-2926649 | 10/2015 |
| JP | 60-77825 A | 5/1985 |
| JP | 61-66104 U | 5/1986 |
| JP | 2003-23881 A | 1/2003 |
| KR | A-2004-0088788 | 10/2004 |
| WO | WO-A1-2007-013158 | 2/2007 |

\* cited by examiner

FIG.23
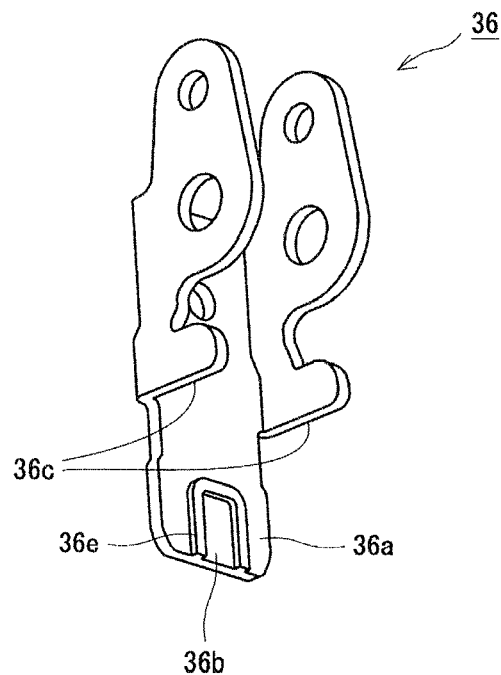
FIG.24A
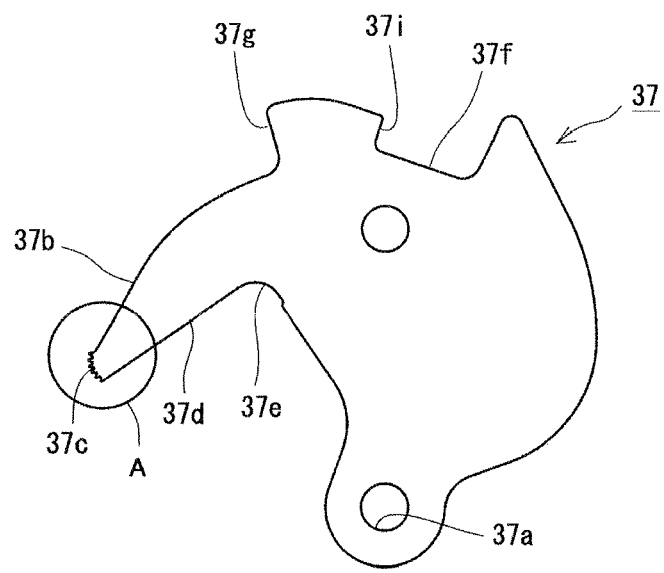
FIG.24B

BINDING MACHINE FOR GARDENING

CROSS-REFERENCE TO RELATED APPLICATION

This application is based on and claims priority under 35 USC119 from Japanese Patent Application No. P2016-119279 filed on Jun. 15, 2016.

TECHNICAL FIELD

The present invention relates to a binding machine for gardening that is used for guiding/binding work in agricultural crop cultivation.

BACKGROUND

In the related art, a binding machine for gardening is used for guiding/binding work at the time of cultivation of agricultural crops. Specifically, the binding machine for gardening is used to bind plant vines and stems to poles or nets in cultivation of agricultural crops such as cucumbers, grapes, or tomatoes.

For example, as illustrated in JP-A-2003-23881, this type of binding machine for gardening includes a main handle capable of drawing out a tape from a front end portion and a clincher arm rotatable with respect to the main handle. When an operation handle of the binding machine for gardening is lightly gripped, the clincher arm rotates in a closing direction with respect to the main handle, and a tape gripping device provided at a front end portion of the clincher arm grips the tape drawn out from the front end portion of the main handle. When the squeezing of the handle is released in this state, the clincher arm rotates in an opening direction with respect to the main handle, and the tape is drawn out. When the tape is drawn out and the tape is stretched between the clincher arm and the main handle, the agricultural crops and poles are pressed against the drawn-out tape, and the agricultural crops and the poles are inserted between the clincher arm and the main handle. When the handle is further gripped again in this state, the clincher arm rotates in the closing direction with respect to the main handle, and a tape loop is formed. When the handle is further gripped, both ends of the tape loop are bound by a staple, the ends of the tape loop are cut by a cutter, and thus the binding is completed.

The tape gripping device provided at the front end portion of the clincher arm includes a fixed-type tape support plate and a picking plate that rotates in a front and rear direction, and a wedge-shaped claw protruding toward the tape support plate is formed at a front end portion of the picking plate. When the tape gripping device grips the tape, the claw rotating by a cam mechanism and a spring is thrust into the tape, and the tape is gripped by being pressed against the tape support plate.

SUMMARY

However, the tape gripping device according to the related art has a problem that the tape is torn when the claw is thrust into the tape. Particularly, for example, when a thin tape is used or the tape is cured at a low temperature, the tape is easily torn, which is apt to cause the problem.

Further, when a thick tape is used, there are problems that the claw is not sufficiently thrust into the tape and the tape is detached from the claw due to resistance when the tape is drawn out. Particularly, when the temperature is high, the tape wound in a reel shape sticks, resistance becomes large when the tape is drawn out, and thus the tape is easily detached from the claw.

Therefore, the invention is to provide a binding machine for gardening including a tape gripping device capable of obtaining high gripping strength without causing a problem that a tape is torn when a claw is thrust into a thin tape or that the claw is not thrust into a thick tape.

The invention has been made to solve the problems, and is characterized by the following.

(1) A binding machine for gardening comprising:
a main handle that is configured to draw out a tape;
a clincher arm that is provided such that an end portion side of the clincher arm is configured to be close to and be away from a tape guide; and
a tape gripping device that is attached to the clincher arm and that is configured to grip the tape drawn out from the main handle, wherein
the tape gripping device includes:
a support portion that is provided on the clincher arm; and
a gripping member that is provided so as to face the support portion, and
the tape gripping device is configured to sandwich and grip the tape by the support portion and the gripping member.

(2) The binding machine for gardening according to (1), wherein
the gripping member is rotatably attached to the clincher arm,
a force is applied on the tape in a pulling-out direction in the state where the tape is gripped by the tape gripping device, and
in a case where a force to rotate the gripping member is generated when the tape is pulled out, the force to rotate the gripping member is configured to be applied in an engaging direction with the support portion.

(3) The binding machine for gardening according to (1) or (2), wherein
a front end portion of the main handle is provided with a tape guide including a guide path through which the tape is guided so as to be drawable, and
the tape guide is formed with a slit which allows the gripping member to enter into the guide path.

(4) The binding machine for gardening according to (3), wherein
the gripping member is configured to grip the tape in accordance with the tape guide in the guide path, to pass in the guide path in a state where the griping member grips the tape, and to grip the tape in accordance with the support portion after passing through the guide path.

(5) The binding machine for gardening according to any one of (1) to (4), wherein
one of the support portion and the gripping member includes at least one concave member and the other of the support portion and the gripping member includes at least one convex member, the at least one concave member is engaged with the at least one convex member, and the at least one concave member and the at least one convex member are configured to grip the tape.

(6) The binding machine for gardening according to any one of (1) to (5), wherein
the gripping member includes a concave-convex member at an engaging portion where the gripping member engages with the support portion.

(7) The binding machine for gardening according to any one of (1) to (6), wherein the engaging portion where the gripping member engages with the support portion is formed of an elastic member.

(8) The binding machine for gardening according to any one of (1) to (7), wherein
the clincher arm is provided with the tape gripping device at a front end portion of a curved arm portion.

(9) The binding machine for gardening according to any one of (1) to (8), wherein
the gripping member is configured to be rotatably attached to the clincher arm, and
a rotating shaft of the gripping member is provided on an upstream side in a drawing direction of the tape with respect to a contact portion between the gripping member and the support portion.

(10) The binding machine for gardening according to any one of (1) to (9), wherein
the tape gripping device is configured to grip the tape held by the tape guide when the end portion side of the clincher arm is close to the tape guide at a first position,
the tape gripping device includes:
the support portion that is configured to move to a position which faces one surface of the tape held by the tape guide when the end portion side of the clincher arm is close to the tape guide at a second position which is away from the tape guide than the first position; and
the gripping member that is configured to move to a position which faces the support portion through the tape to be in contact with the tape when the end portion side of the clincher arm is close to the tape guide at the first position, and configured to grip the tape with the support portion.

(11) The binding machine for gardening according to any one of (1) to (10), wherein
the clincher arm is rotatably attached to the main handle such that the end portion side of the clincher arm is configured to be close to and be away from the tape guide.

(12) The binding machine for gardening according to any one of (1) to (11), wherein
the support portion includes a plate-like receiving portion which is fixed to the clincher arm along a drawing direction of the tape and which is configured to support one surface of the tape.

(13) The binding machine for gardening according to (12), wherein
the receiving portion includes a recessed portion which is configured to be in contact with the support portion through the tape.

(14) The binding machine for gardening according to (13), wherein
the recessed portion is a groove which width is narrower than the tape and wider than an end portion of the support portion.

(15) The binding machine for gardening according to any one of (12) to (14), wherein
the receiving portion includes a movement restricting portion which is protrudingly formed on both sides of the receiving portion and which is configured to restrict rotation of the clincher arm by being in contact with the tape guide.

(16) The binding machine for gardening according to any one of (1) to (15), wherein
the gripping portion is pivotally supported to be rotatable with respect to the clincher arm.

(17) The binding machine for gardening according to any one of (13) to (16), wherein
the gripping portion includes a claw portion which is configured to enter into the recessed portion through the tape and configured to grip the tape when the end portion side of the clincher arm is close to the tape guide at the first position.

(18) The binding machine for gardening according to any one of (1) to (17),
wherein
the tape gripping device includes:
a gripping member urging unit which is configured to urge the gripping member toward the support portion; and
a lock member which is configured to hold the gripping member at a standby position against an urging force of the gripping member urging unit by being engaged with the gripping member,
when a lock operation of the lock member is released, the gripping member operates, and the tape is gripped between the support portion and the gripping member from both sides of the tape.

According to the above (1), the tape gripping device includes the support portion provided on the clincher arm and the gripping member provided to face the support portion, and thus the tape can be sandwiched and gripped between the support portion and the gripping member from both sides thereof. Since this configuration does not have a structure in which a claw is thrust into the tape and the tape is gripped, there is no problem that the tape is torn when the claw is a thin tape or the claw is not thrust into a thick tape. Therefore, the binding work can be performed using the thin tape or the thick tape which could not be used in the past, and can be performed even at a low or high temperature at which the tape can hardly be held well.

According to the above (2), the force acts on the tape in the pulling-out direction in the state where the tape is gripped by the tape gripping device, and when the force to rotate the gripping member is generated when the tape is pulled out, the force to rotate the gripping member acts in the engaging direction with the support portion. According to this configuration, the gripping member rotates in the engaging direction (a direction in which the sandwiching becomes strong) with the support portion by being pulled due to the friction of the gripping member and the surface of the tape even when the tape is pulled in the pulling-out direction, whereby the pullout of the gripped tape can be prevented.

According to this configuration, since the gripping member rotating shaft can be disposed on the front end portion side of the clincher arm, the height of the tape gripping device (the width coming in contact with the crop when the machine is inserted into the gap between the crops) can be made small. Thus, when the machine is inserted into the gap between the crops or the machine is pulled out from the space between the crops, the machine hardly comes in contact with the crops, and thus workability thereof can be improved.

Moreover, since the protruding portion (claw and the like) of the gripping member is directed inward so as not to protrude toward the opening, it is also possible to make it hard to cause the problem that the protruding portion comes in contact with the crop to damage the crop when the crop is inserted between the main handle and the clincher arm.

According to the above (3), the tape guide is formed with the slit which can allow the gripping member to enter into the guide path. According to this configuration, it is possible to reliably grip the tape without increasing an operation stroke of the gripping member. In the related art, since the front end portion of the tape outside the guide path is gripped, there is a possibility that the tape can hardly be gripped well due to the reason that the front end portion of the tape hangs down. In this regard, according to the invention, since the gripping member enters into the guide path from the slit and can grip the tape in the guide path, it is possible to grip the tape supported by the guide path, and to reliably grip the tape.

According to the above (4), the gripping member grips the tape in accordance with the tape guide in the guide path, slides in the guide path in the state of gripping the tape, and grips the tape in accordance with the support portion after passing through the guide path. That is, the gripping member grips the tape in two steps, for example, first, the gripping member grips the tape in accordance with the tape guide in the guide path, and then grips the tape in accordance with the support portion. According to this configuration, it is possible to prevent the tape from being detached from the guide path. Specifically, a structure can also be provided in which the slit is provided on both surfaces in the guide path, and the gripping member grips the tape in accordance with the support portion in the guide path. However, in this way, the tape pressed toward the support portion may be torn due to the friction with the edge of the slit provided on the side of the support portion, or the tape pressed toward the support portion may slip off from the slit provided on the side of the support portion (detached from the guide path). When the tape is detached from the guide path, troubles may be caused in the subsequent gripping operation. In this regard, when the tape is gripped in two steps, it is possible to prevent the tape from being torn due to the friction with the edge of the slit, or to prevent the tape from being detached from the guide path.

According to the above (5), the support portion and the gripping member include the concave-convex members that are engaged with each other, and the tape can be gripped by the concave-convex members. According to this configuration, when the tape is gripped by the concave-convex members, the friction occurs between the edges of the concave-convex members and the surface of the tape, and thus the force to hold the tape can be enhanced.

According to the above (6), the gripping member includes a concave-convex member at the engaging portion with the support portion. According to this configuration, the coefficient of friction increases due to the concave-convex member, and thus the force to hold the tape can be enhanced.

According to the above (7), the engaging portion of the gripping member with the support portion is formed of the elastic member. According to this configuration, a large friction is generated between the elastic member and the surface of the tape, and thus the force to hold the tape can be enhanced.

Further, According to the above (8), the clincher arm is provided with the tape gripping device at the front end portion of the curved arm portion. According to this configuration, due to the synergistic effect of the small-sized tape gripping device and the curved arm portion, the front end portion of the machine is easily inserted into the object to be bound, and thus operability is improved.

BRIEF DESCRIPTION OF THE DRAWINGS

FIG. 23 is a perspective view of a support portion according to a modified example; and FIGS. 24A and 24B are a side view and a partially enlarged side view of a gripping member according to the modified example, respectively.

DETAILED DESCRIPTION

An embodiment of the invention will be described with reference to the drawings. In the following description, the front means a direction (a right direction in FIG. 2) in which a binding machine for gardening 10 faces an object S to be bound at the time of use, and the rear means a direction (a left direction in FIG. 2) opposite to the front.

Figure 1:
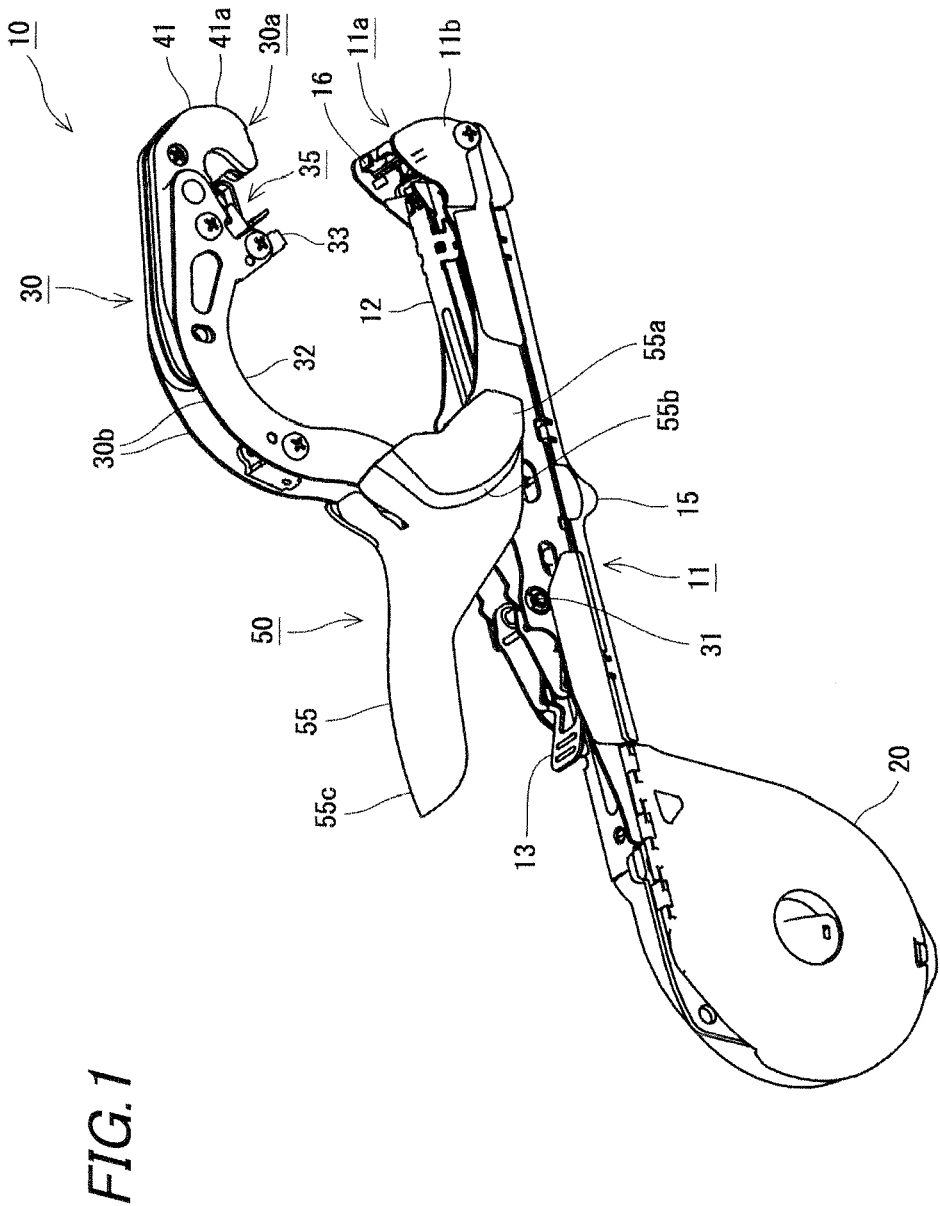
FIG. 1 is an external perspective view of a binding machine for gardening.
Figure 2:
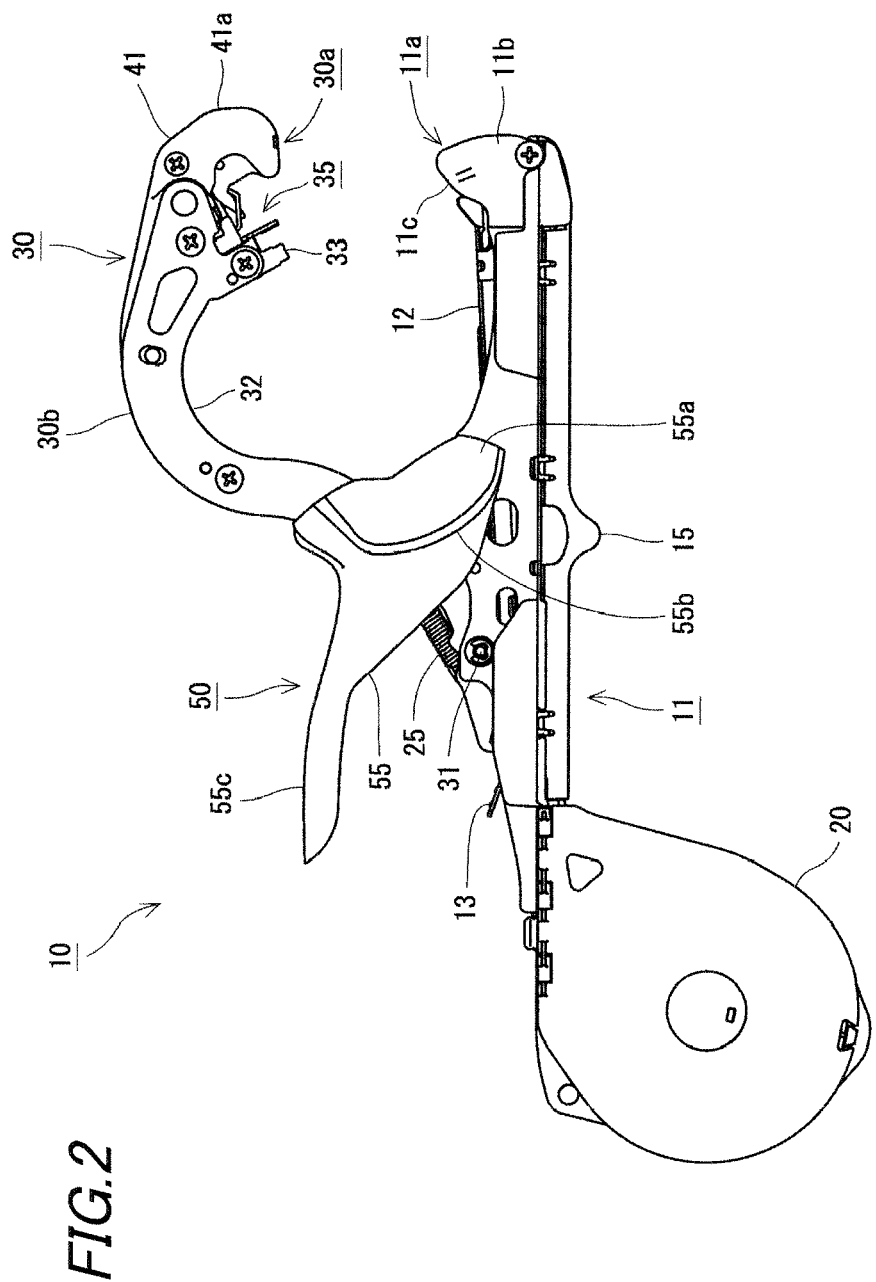
FIG. 2 is a side view of the binding machine for gardening and illustrates a state in which a clincher arm is opened with respect to a main handle.
Figure 3:
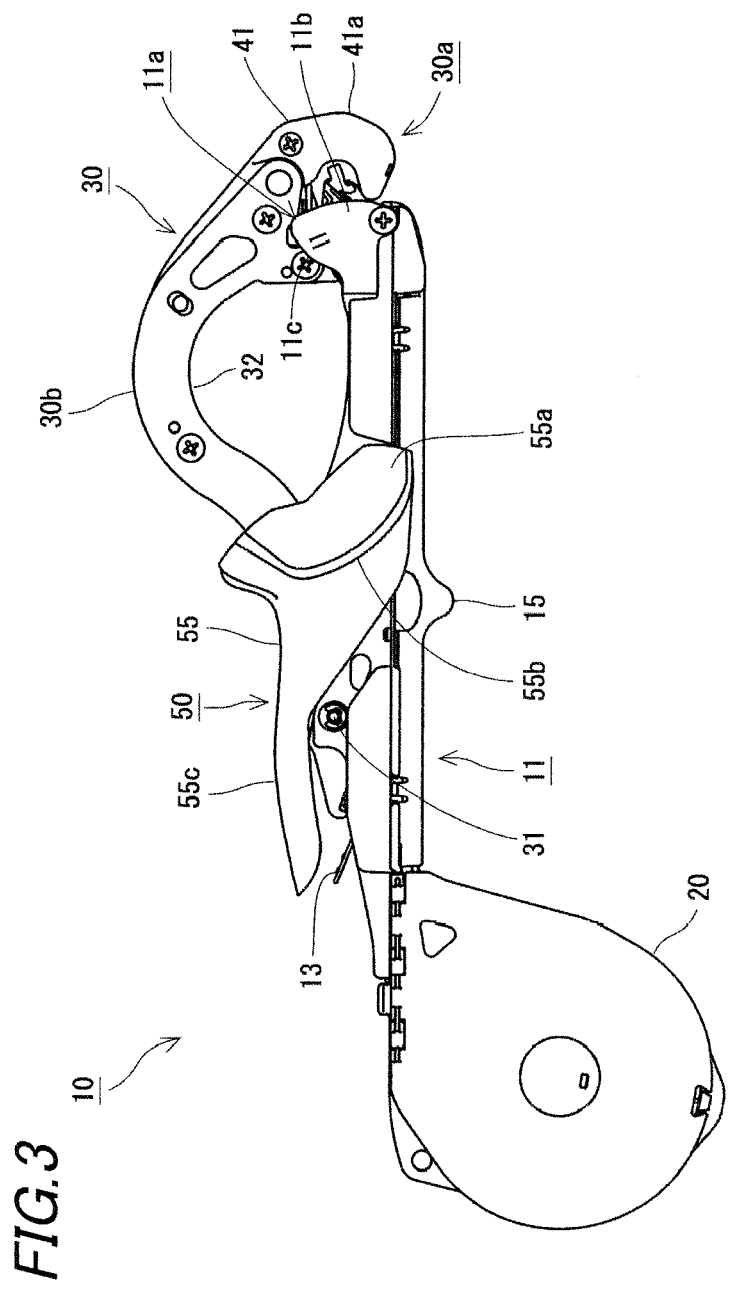
FIG. 3 is a side view of the binding machine for gardening and illustrates a state in which the clincher arm is completely closed with respect to the main handle.
Figure 4:
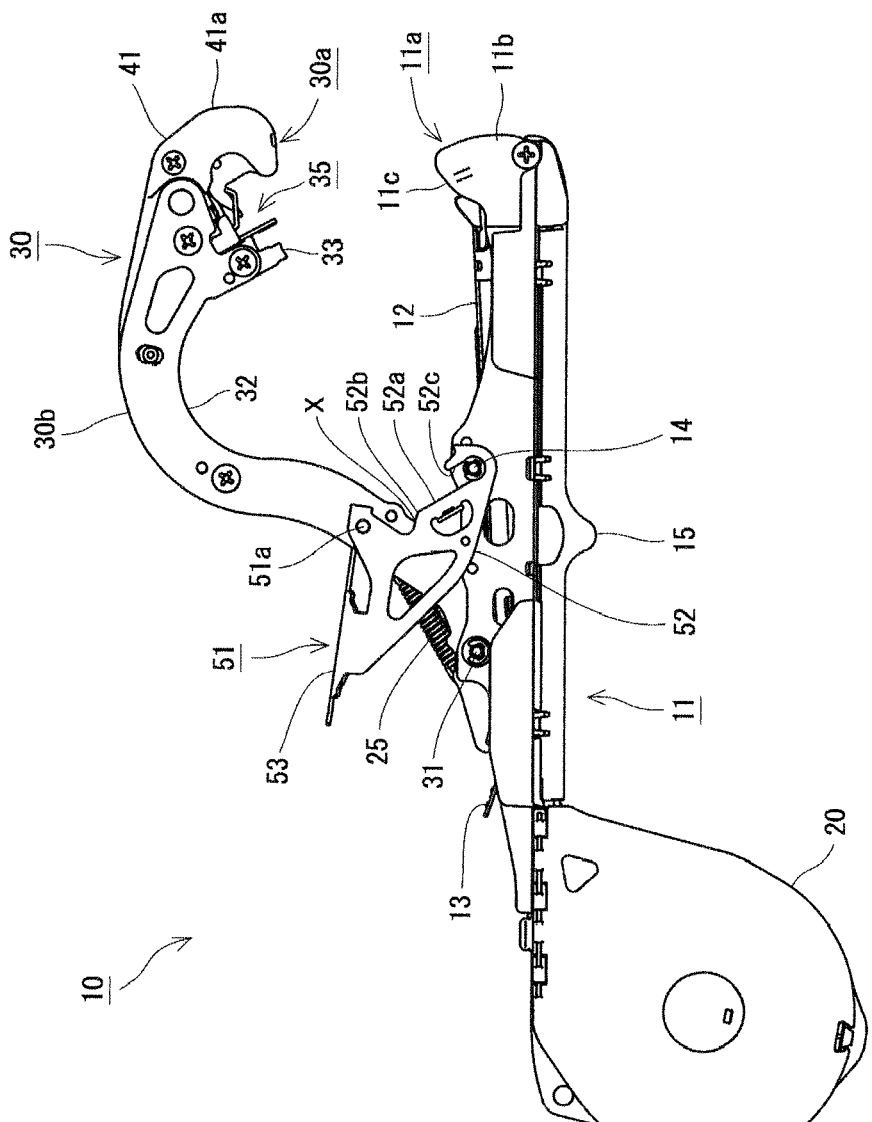
FIG. 4 is a side view of the binding machine for gardening from which a cover member of an operation handle is removed and illustrates a state in which the clincher arm is opened with respect to the main handle.

As illustrated in FIGS. 1 to 3, the binding machine for gardening 10 according to the embodiment is used for guiding/binding work in agricultural crop cultivation includes an elongated main handle 11 that is linearly formed, a clincher arm 30 that is rotatably attached to the main handle 11, and an operation handle 50 that is rotatably attached to the clincher arm 30. As illustrated in FIG. 4, the clincher arm 30 is constantly urged by a tension spring 25, and is in an open state with respect to the main handle 11 in normal times. When the operation handle 50 and the main handle 11 are gripped from this state, as illustrated in FIG. 3, the clincher arm 30 is configured to rotate in a closing direction with respect to the main handle 11. Then, when the clincher arm 30 rotates in the closing direction up to a predetermined position with respect to the main handle 11, in order to draw out a tape 60 from a front end portion 11a of the main handle 11, a gripping operation is executed to grip the tape 60 at a front end portion 30a of the clincher arm 30 and a binding operation is executed to bundle the object S to be bound with the tape 60 and to cut the tape 60 when the clincher arm 30 further rotates in the closing direction from the predetermined position with respect to the main handle 11 and is thus completely closed (closed state). In the gripping operation, that is, the clincher arm 30 rotates with respect to the main handle 11 up to a predetermined position without squeezing the handle up to a completely closed position. Meanwhile, in the binding operation, the clincher arm 30 further rotates in the closing direction from the predetermined position with respect to the main handle 11 by performing a squeezing operation of the handle up to the completely closed position. In this way, the gripping operation and the binding operation can be switched by the end point position of the squeezing operation. As will be described in detail below, in the embodiment, movement of the clincher arm 30 is restricted so as not to further rotate in the closing direction from the predetermined position when the gripping operation is performed, whereas the restriction is canceled when the binding operation is performed. For this reason, even if a worker does not recognize the end point position of the squeezing operation, when the operation of squeezing the depth side is performed, the gripping operation and the binding operation are automatically performed in turns.

Figure 19:
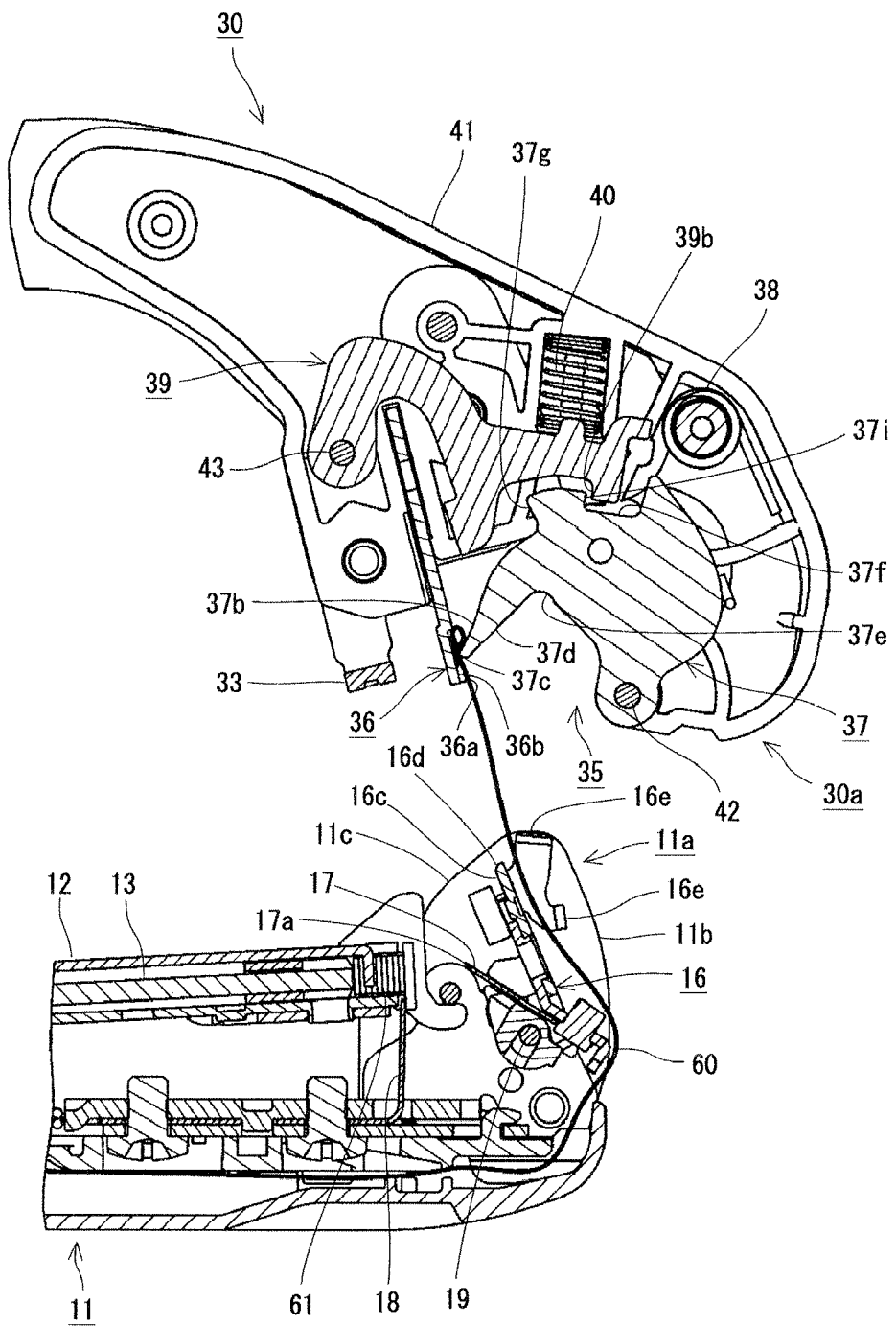
FIG. 19 is a partially enlarged sectional view of the binding machine for gardening and illustrates a state in which a tape is gripped and drawn out by a tape gripping device.
Figure 22:
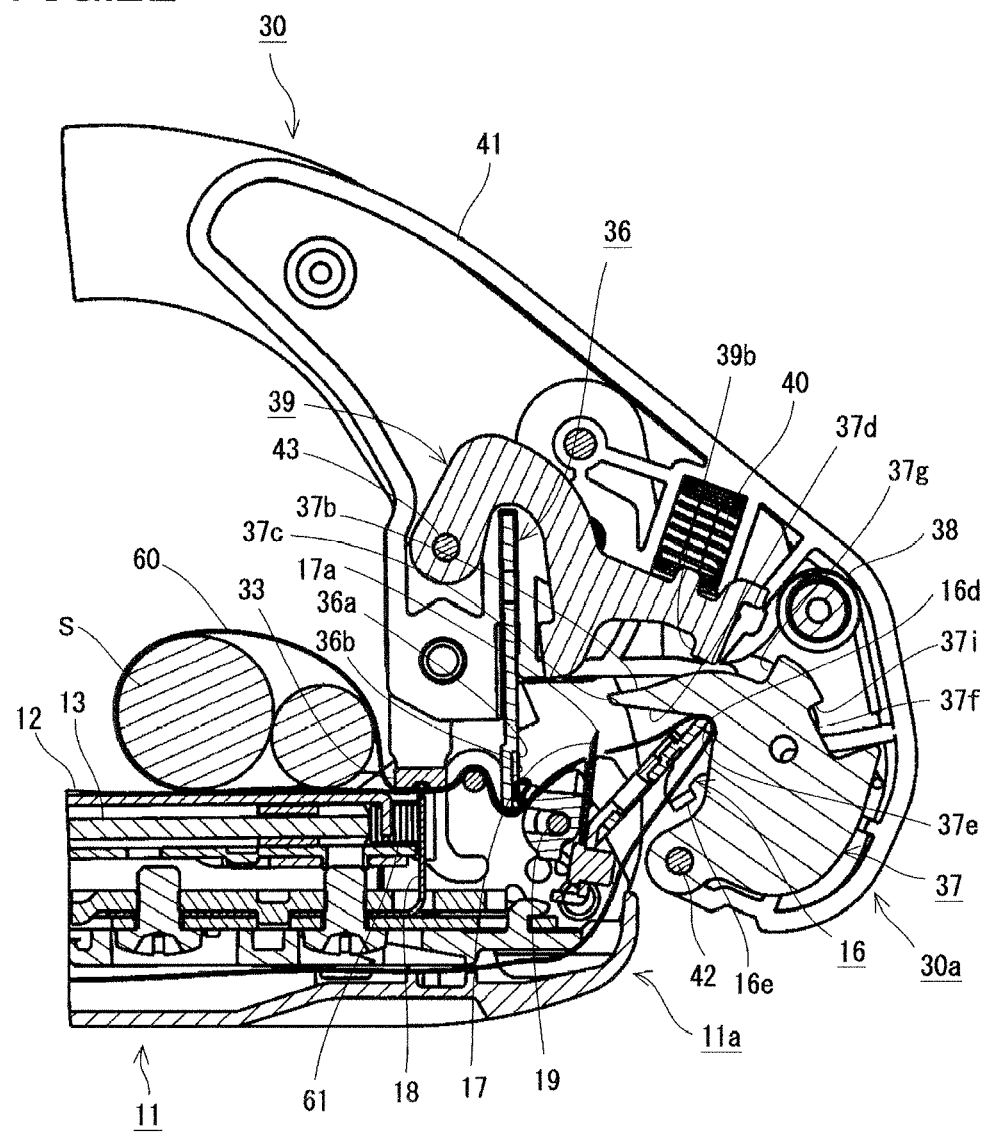
FIG. 22 is a partially enlarged sectional view of the binding machine for gardening and illustrates a state in which a tape is cut.

First, the handle is gripped, and the clincher arm 30 rotates in the closing direction with respect to the main handle 11, thereby binding the object S to be bound. Thus, the gripping operation is executed to grip the tape 60 at the front end portion 30a of the clincher arm 30. Thereafter, when the squeezing of the handle is released and thus the clincher arm 30 rotates in the opening direction with respect to the main handle 11, as illustrated in FIG. 19, the front end portion 30a of the clincher arm 30 and the front end portion 11a of the main handle 11 are separated from each other in a state where the tape 60 is gripped, and the tape 60 is in a state of being stretched between the clincher arm 30 and the main handle 11. The objects S to be bound such as seedlings or branches are introduced from the outside of the tape 60 stretched in this state, the handle is gripped again, and thus the clincher arm 30 rotates in the closing direction with respect to the main handle 11. Thus, as illustrated in FIG. 22, both ends of a tape loop for binding the objects S to be bound are bonded by a staple 61, and the tape 60 is cut (the binding operation is executed). In this manner, the gripping operation is executed in the first squeezing operation, and the binding operation is executed in the second squeezing operation. When the gripping operation and the binding operation are executed in turns, the objects S to be bound can be bound. In the embodiment, the staple 61 is used as a bonding unit for bonding the both ends of the tape loop, but the both ends of the tape loop may be bonded by adhesion or welding without being limited thereto.

As illustrated in FIG. 1 and the like, the main handle 11 is a bar-like member which is linearly formed, and is formed such that the tape 60 and the staple 61 can be formed along a longitudinal direction. A staple magazine 12, a pusher unit 13, a tape guide 16, a staple driver 18, and a tape magazine 20 are attached to the main handle 11.

The staple magazine 12 is a long member for accommodating the staple 61. As illustrated in FIG. 1 and the like, the staple magazine 12 is disposed along the longitudinal direction of the main handle 11, and can accommodate the staple 61 therein. As the staple 61 accommodated in the staple magazine 12, a plurality of U-shaped staples 61 bonded with an adhesive are used. The staple 61 accommodated in the staple magazine 12 is pushed toward the front end portion by the pusher unit 13 which will be described below. At the front end portion of the staple magazine 12, a long hole is provided to introduce the staple driver 18 which will be described below. In addition, the staple magazine 12 is attached to the main handle 11 so as to be rockable around a shaft provided at a rear end side.

Figure 6:
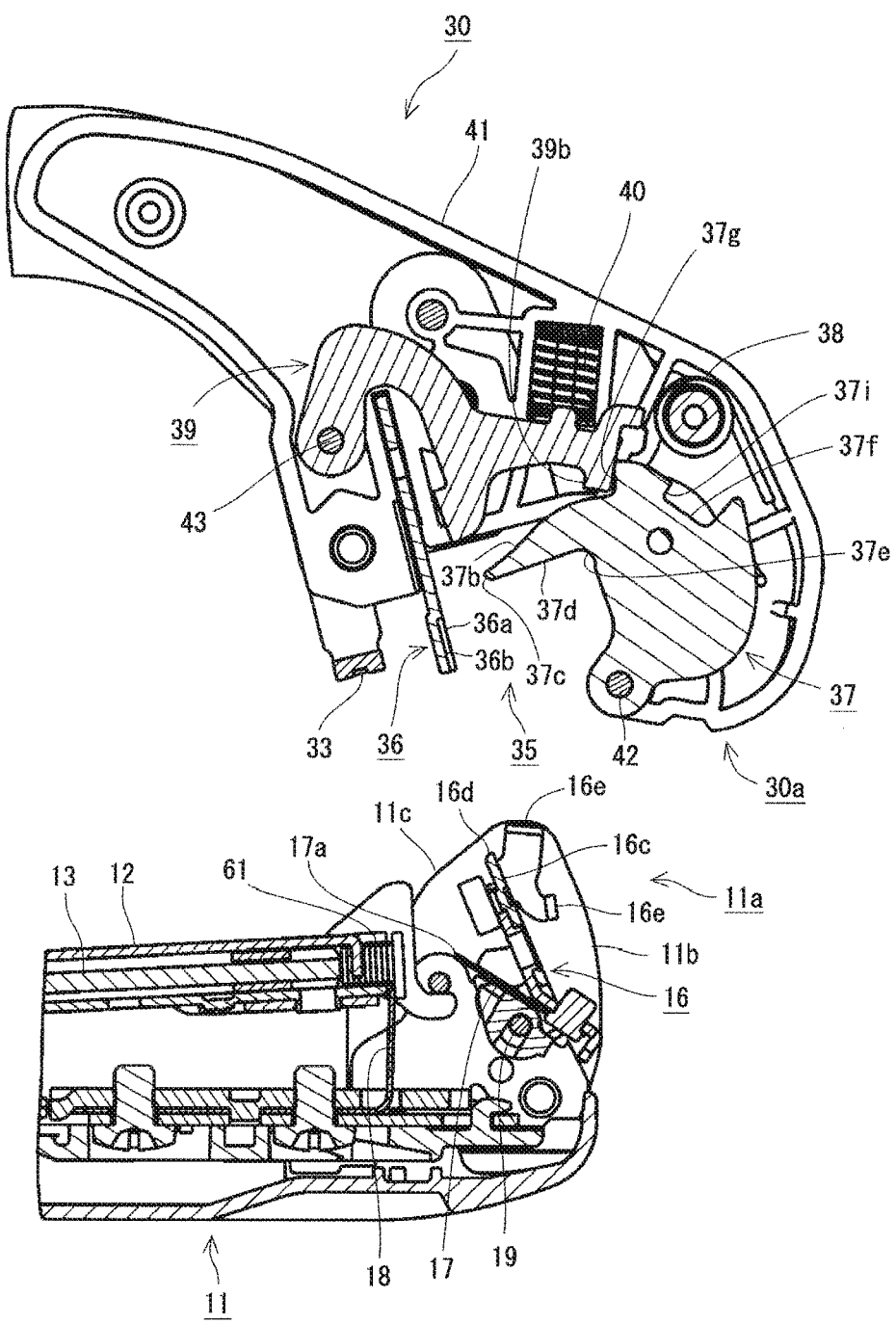
FIG. 6 is an enlarged sectional view of the vicinity of a front end portion of the binding machine for gardening.

As illustrated in FIG. 1 and the like, the pusher unit 13 is a member that can be inserted and attached to the staple magazine 12. As illustrated in FIG. 6 and the like, the pusher unit 13 urges the staple 61 accommodated in the staple magazine 12 toward the front. When the staple 61 is set in the staple magazine 12, the pusher unit 13 is drawn down to insert the staple 61 from the top of the staple magazine 12.

As illustrated in FIG. 6 and the like, the staple driver 18 is a plate fixed to the front end portion 11a of the main handle 11 so as to face the vicinity of the front end portion of the staple magazine 12. The staple driver 18 is formed to have substantially the same width as the staple 61 so that only one staple 61 can be ejected. When the clincher arm 30 rotates to the state of being completely closed with respect to the main handle 11, as illustrated in FIG. 22, the staple driver 18 enters into the staple magazine 12, thereby ejecting the leading staple 61 accommodated in the staple magazine 12. Specifically, when the clincher arm 30 moves in the closing direction, the clincher arm 30 pushes the staple magazine 12 to rock it toward the staple driver 18. As the staple magazine 12 rocks, the staple driver 18 enters into the staple magazine 12, thereby ejecting the staple 61. After penetrating through the tape 60, the ejected staple 61 is clinched by the clincher 33 to be described below, so that two legs thereof are refracted to embrace the tape 60 and thus bonded to an end 60a of the overlapped tape 60.

Figure 12:
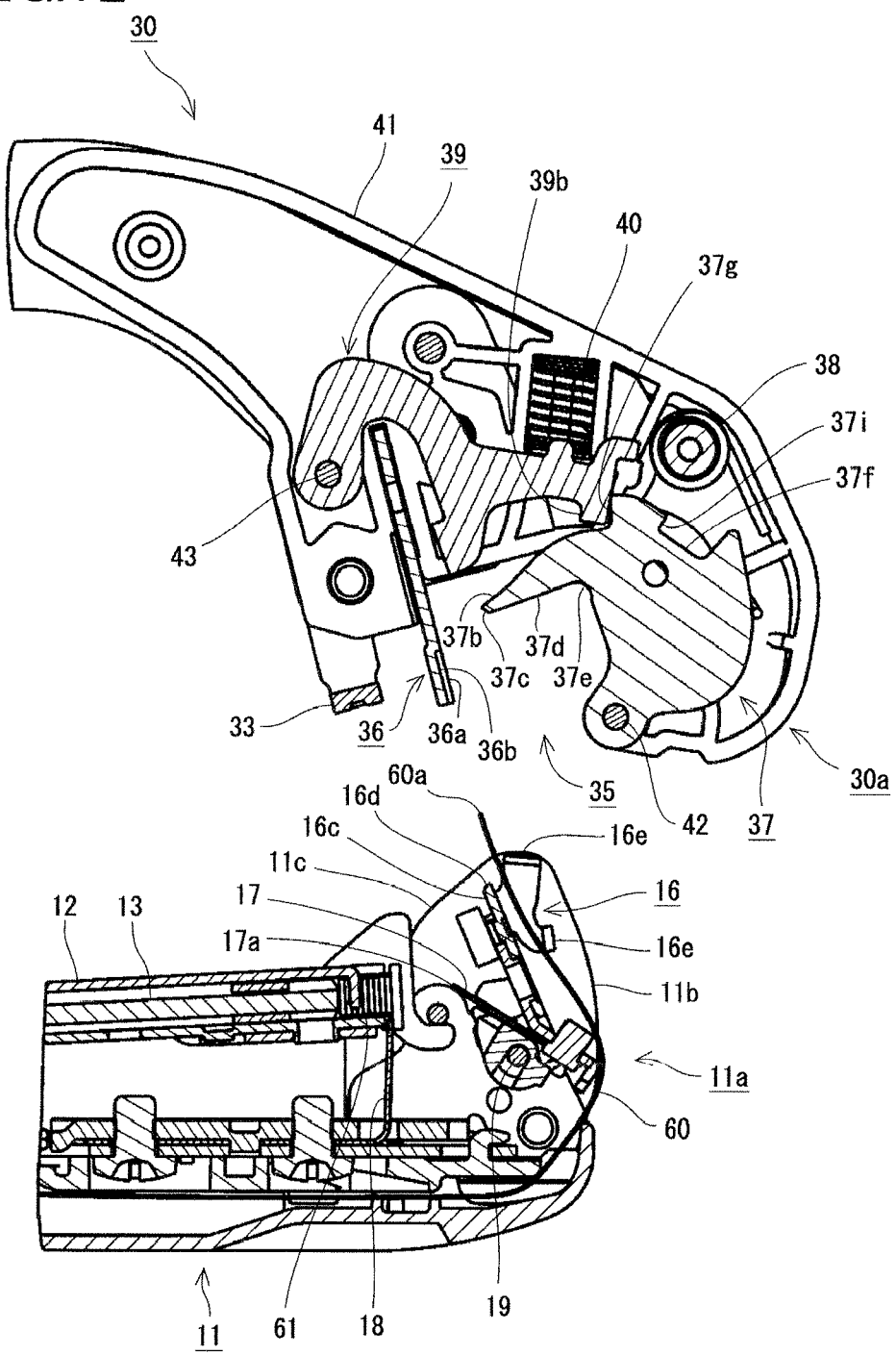
FIG. 12 is a partially enlarged sectional view of the binding machine for gardening and illustrates a state before a gripping operation is executed.
Figure 13:
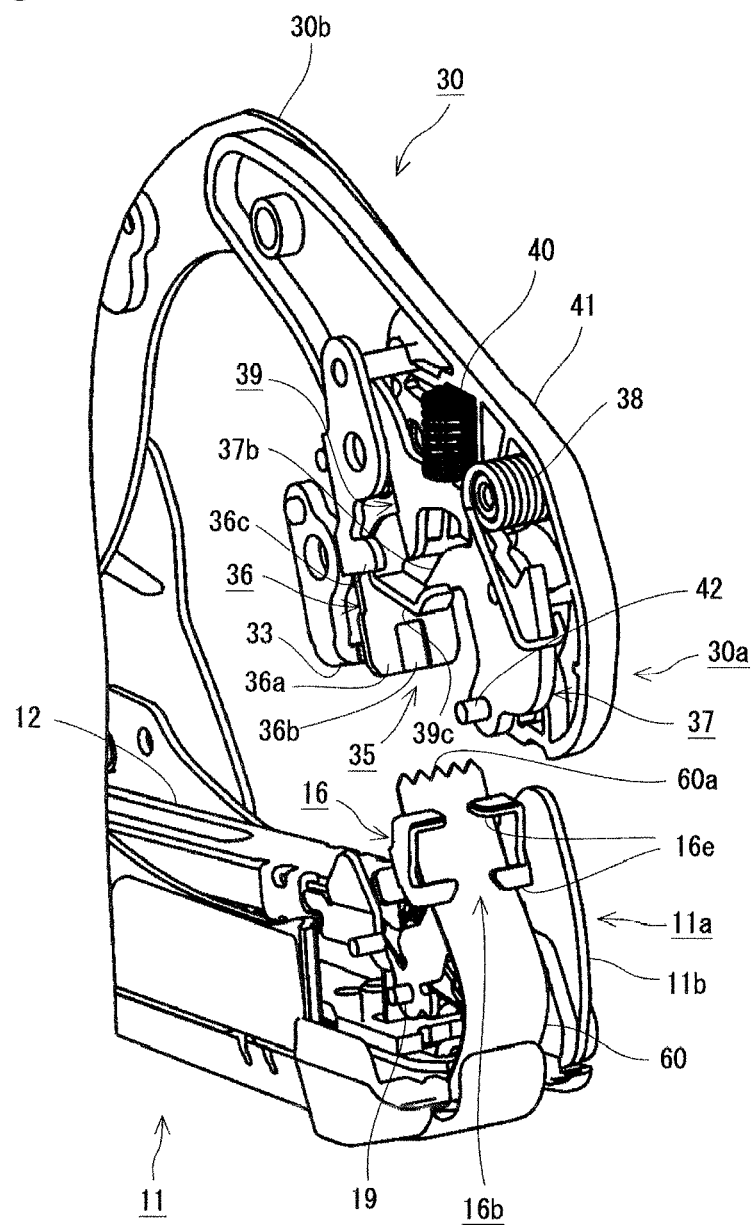
FIG. 13 is a partially enlarged perspective view of the binding machine for gardening and illustrates a state before the gripping operation is executed.

As illustrated in FIG. 1 and the like, the tape magazine 20 is provided continuously with a rear end of the main handle 11 to accommodate the tape 60. The tape magazine 20 is capable of accommodating the tape 60 wound in a reel shape, and has a lid which can be openable to take in and out the tape 60. The tape 60 accommodated in the tape magazine 20 is drawn out to the front end portion 11a of the main handle 11 along the main handle 11. In the tape 60 drawn out to the front end portion 11a of the main handle 11, as illustrated in FIGS. 12 and 13, the end 60a thereof is held by the tape guide 16 which will be described below.

Figure 7:
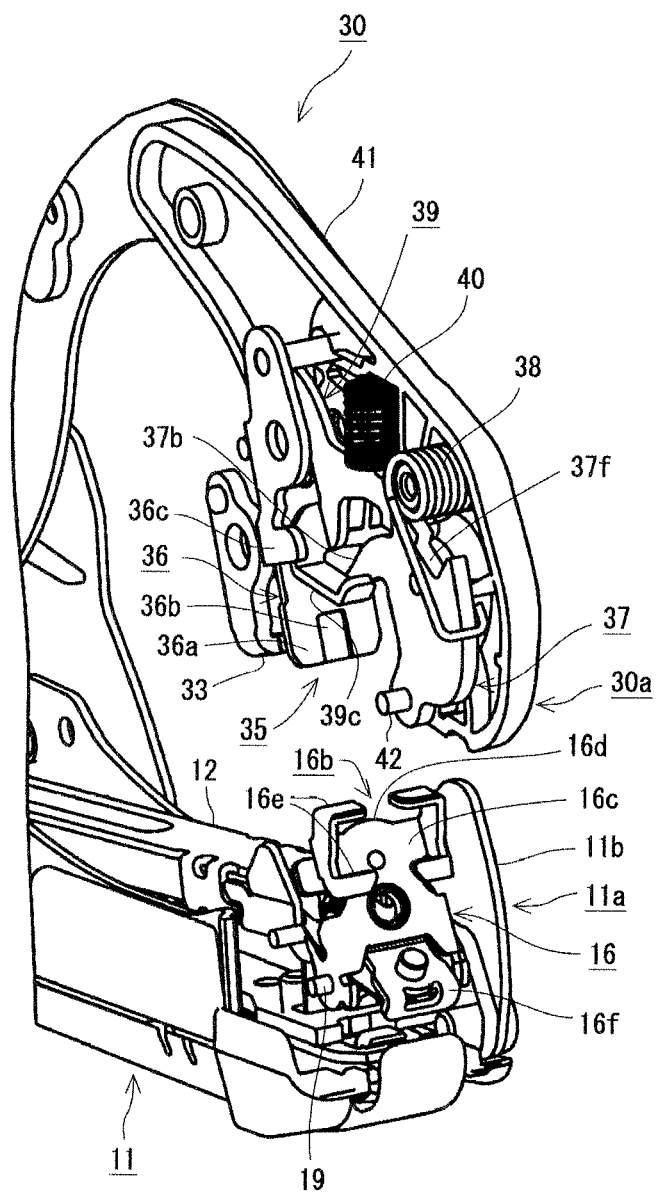
FIG. 7 is a perspective view illustrating an internal structure in the vicinity of the front end portion of the binding machine for gardening.

As illustrated in FIGS. 6 and 7, the tape guide 16 is disposed at the front end portion 11a of the main handle 11, and is attached so as to be rockable around a tape guide rocking shaft 19 provided in the main handle 11. The tape guide 16 has a guide path at a center thereof as illustrated in FIG. 13, the tape 60 being guided so as to be drawable through the guide path. The guide path of the tape guide 16 has such a shape as to cover four sides such as both sides, a front side, and a rear side of the tape 60, so that the inserted tape 60 is not detached. The tape 60 inserted through the guide path is drawn out from the front end portion and faces the clincher arm 30. The end 60a of the tape 60 is gripped by a tape gripping device 35, which will be described below, of the clincher arm 30, and is drawn out by a required amount.

Figure 8A:
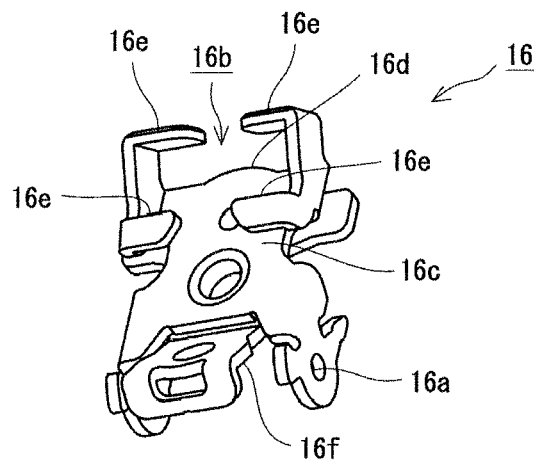
FIG. 8A is a perspective view of a tape guide as viewed from the front.
Figure 8B:
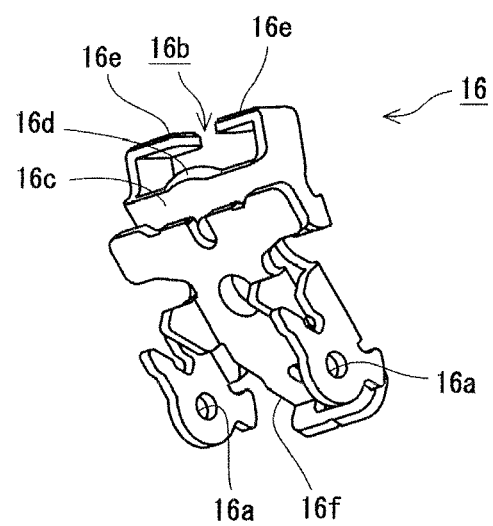
FIG. 8B is a perspective view of the tape guide as viewed from the rear.

As illustrated in FIGS. 8A and 8B, the tape guide 16 includes a rocking shaft hole 16a, a slit 16b, a back surface portion 16c, an abutment portion 16d, a tape holding portion 16e, and a cutting blade fitting portion 16f.

The rocking shaft hole 16a is a round hole through which the tape guide rocking shaft 19 penetrates. The rocking shaft hole 16a is provided at a lower part of the tape guide 16 (a side far from the clincher arm 30). The rocking shaft hole 16a is pivotally supported by the tape guide rocking shaft 19, and thus an end portion of the tape guide 16 facing the clincher arm 30 is rockable forward. Although not specifically illustrated, the tape guide 16 is constantly urged rearward by an urging member.

The back surface portion 16c is a plate-shaped portion that supports the tape 60 from the rear side. The tape holding portions 16e protrude forward from both sides of the back surface portion 16c. The tape holding portions 16e are configured to hold the tape 60 in accordance with the back surface portion 16c. In the embodiment, a pair of tape holding portions 16e are provided at each of two upper and lower parts, and four tape holding portions 16e are provided. Each of the tape holding portions 16e is formed in a substantially L shape, and the pair of upper and lower tape holding portions 16e are disposed such that the front end portions thereof are opposed to each other. Thus, the slit 16b is formed between the opposing front end portions of the tape holding portions 16e. The slit 16b allows a gripping member 37, which will be described below, to enter into the guide path.

As illustrated in FIGS. 8A and 8B, the abutment portion 16d is formed at an upper end edge of the back surface portion 16c, contacts with an inclined surface 37d of the gripping member 37 which will be described below, and slides along the inclined surface 37d. The abutment portion 16d protrudes toward the front end portion in an R shape, and thus is formed so as not to contact with both side edges of the inclined surface 37d of the gripping member 37. The contact with the edges of the inclined surface 37d is prevented, and thus when the tape 60 is sandwiched and pulled by the abutment portion 16d and the gripping member 37 as will be described below, it is prevented that a hole is generated in the tape 60 or the tape 60 is torn.

The cutting blade fitting portion 16f is configured to fix the cutting blade 17 for cutting the tape 60 after the binding of the objects S to be bound. As illustrated in FIG. 6 and the like, the cutting blade 17 is attached to the cutting blade fitting portion 16f so as to form an angle with respect to the guide path of the tape 60 behind the guide path of the tape 60. When the cutting blade 17 is fixed to the tape guide 16 in this way and thus the tape guide 16 rocks, the cutting blade 17 rocks in conjunction with the tape guide 16.

That is, as illustrated in FIG. 12, the cutting blade 17 is disposed such that a cutting edge 17a is directed backward in normal times, but the cutting edge 17a moves to be directed upward as illustrated in FIG. 22 when cutting the tape 60. As described above, the cutting blade 17 according to the embodiment is exposed so that the cutting edge 17a faces the tape 60 when cutting the tape 60. In the embodiment, the tape 60 rocks in conjunction with the tape guide 16. However, for example, the tape guide 16 is formed to move in a straight direction, and the cutting blade 17 may move in the straight direction in conjunction with the tape guide 16. Further, a member in the vicinity of the cutting blade 17 such as the tape guide 16 or the staple magazine 12 may move instead of the movement of the cutting blade 17, and the cutting edge 17a of the cutting blade 17 may be exposed so as to face the tape 60.

As illustrated in FIG. 1, both sides of the tape guide 16 and the cutting blade 17 are covered with a sidewall 11b which is a part of the main handle 11, and as illustrated in FIGS. 2 and 6, the tape guide 16 and the cutting blade 17 are not exposed in a side view. In other words, the main handle 11 is provided with the sidewall 11b which is disposed so as to overlap with the cutting edge 17a of the cutting blade 17 in a side view. The sidewall 11b is disposed so as to constantly overlap with the cutting edge 17a of the cutting blade 17 in a side view regardless of the state of the cutting blade 17 (either before or after the cutting blade 17 has moved). Therefore, even when foreign materials are caught by the front end portion 11a of the main handle 11, the cutting blade 17 is not stuck by the foreign materials. A rear side of the sidewall 11b is an inclined portion 11c, so that even when the object S to be bound is sandwiched by the front end portion 11a of the main handle 11, the object S to be bound can be guided toward the rear side (the main handle 11 and an inner side of the clincher arm 30).

Figure 5:
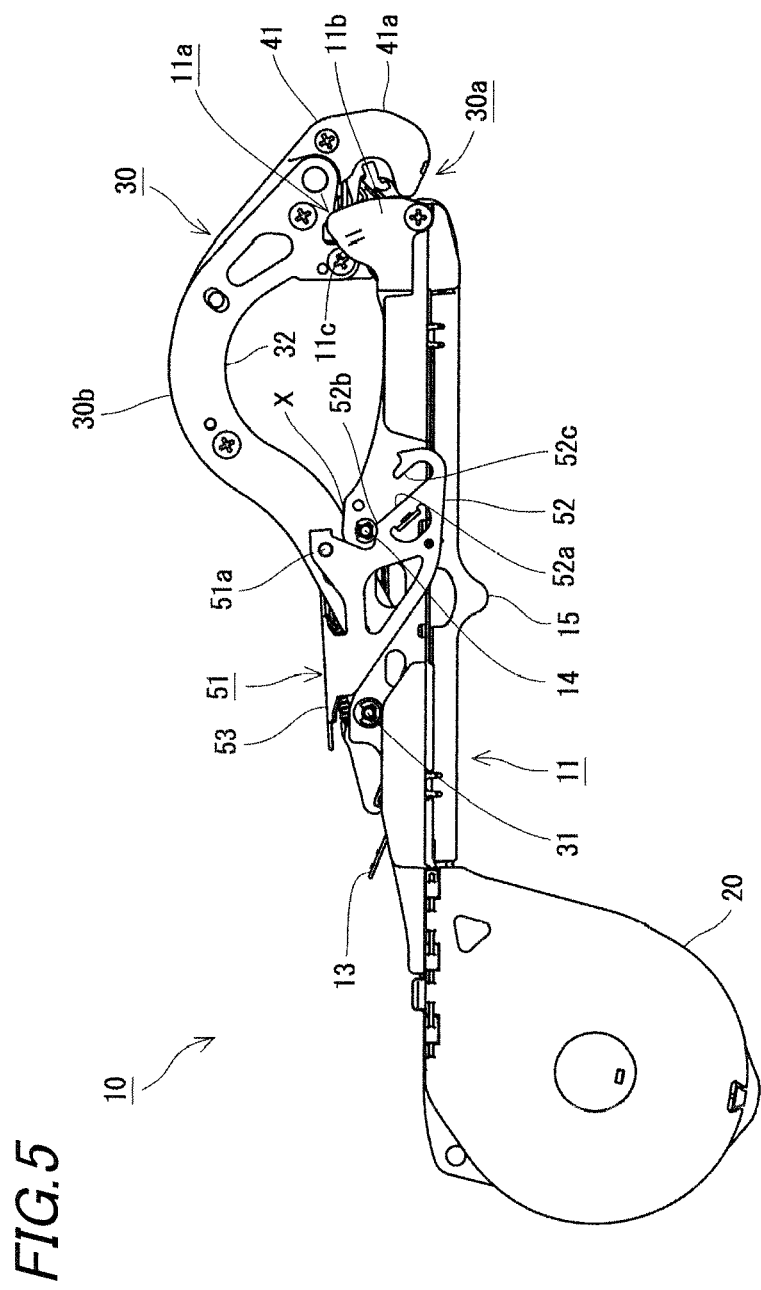
FIG. 5 is a side view of the binding machine for gardening from which the cover member of the operation handle is removed and illustrates a state in which the clincher arm is completely closed with respect to the main handle.

As illustrated in FIGS. 4 and 5, a roller-like engaging portion 14 is protrudingly formed on both sides of the main handle 11, and a finger hooking portion 15 is protrudingly formed on a lower surface of the main handle 11. The roller-like engaging portion 14 is a projection for slidably guiding a link portion 52 of the operation handle 50 which will be described below. The finger hooking portion 15 is a projection for hooking a finger squeezing the handle when the main handle 11 and the operation handle 50 are gripped.

As illustrated in FIG. 1 and the like, the clincher arm 30 is constituted by a pair of sheet metal members 30b connected to each other in parallel. The clincher arm 30 includes an arm portion 32 that extends curvedly toward the front end portion 30a so that a C-shaped opening can be formed between the clincher arm 30 and the main handle 11. The clincher arm 30 is rotatably attached to the main handle 11 by a rotating shaft 31 provided in the vicinity of the rear end.

The clincher 33, the tape gripping device 35, and a gripping device cover 41 are attached to the clincher arm 30.

The clincher 33 is fixed to the front end portion 30a of the clincher arm 30 so as to face the front end portion of the staple driver 18 described above. Thus, as illustrated in FIG. 22, when the staple 61 is ejected by the staple driver 18, the two legs of the ejected staple 61 are clinched by the clincher 33 and bent inward. When the clincher 33 bends the two legs of the staple 61 inward, so that the two legs bind the tape 60 and are thus bonded thereto.

The tape gripping device 35 is attached to the front end portion 30a of the clincher arm 30 and is capable of gripping the end 60a of the tape 60 drawn out from the front end portion 11a of the main handle 11. The tape gripping device 35 includes a support portion 36, a gripping member 37, a gripping member urging unit 38, a lock member 39, and a lock member urging unit 40.

Figure 9:
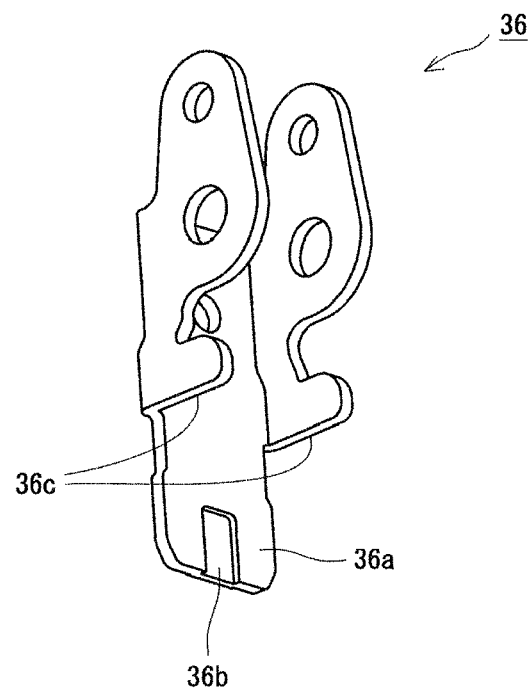
FIG. 9 is a perspective view of a support portion.

As illustrated in FIG. 6 and the like, the support portion 36 is fixed to the clincher arm 30 along the drawing direction of the tape 60, and includes a plate-like receiving portion 36a capable of supporting the rear surface of the tape 60. As illustrated in FIG. 9, a recessed portion 36b is formed in the receiving portion 36a. The recessed portion 36b is a portion to be engaged with a contact portion 37c of the gripping member 37 which will be described below, and has a groove narrower than the tape 60 and wider than the contact portion 37c. In addition, movement restricting portions 36c are protrudingly formed on both sides of the receiving portion 36a. The movement restricting portion 36c is provided to restrict the rotation of the clincher arm 30 by being brought into contact with tape guide 16.

Figure 10:
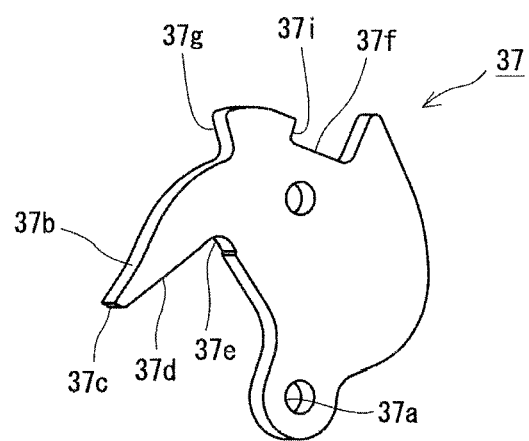
FIG. 10 is a perspective view of a gripping member.

The gripping member 37 is provided so as to face the support portion 36, and is provided movably toward the support portion 36 so as to grasp the tape 60. As illustrated in FIG. 10, the gripping member 37 includes a rotating shaft hole 37a, a claw portion 37b, a contact portion 37c, an inclined surface 37d, a V-shaped portion 37e, a peripheral surface 37f, a locked portion 37g, and a rotation blocking portion 37i.

The rotating shaft hole 37a is a hole through which a gripping member rotating shaft 42 penetrates. When the gripping member rotating shaft 42 penetrates through the rotating shaft hole 37a, the gripping member 37 is pivotally supported to be rotatable with respect to the clincher arm 30.

The claw portion 37b is a protruding portion for grasping the tape 60 in accordance with the receiving portion 36a of the support portion 36. The contact portion 37c capable of entering into the above-described recessed portion 36b is formed at a front end portion of the claw portion 37b. Thus, when the gripping member 37 is operated, the tape 60 can be firmly gripped by the concave-convex members (recessed portion 36b and contact portion 37c) through which the support portion 36 and the gripping member 37 are engaged with each other. That is, when the tape 60 is gripped with the concave-convex members, an intermediate part of the tape 60 is in a state of being pushed into the groove of the recessed portion 36b. In this state, a restoring force of the bent tape 60 is applied on the edge of the recessed portion 36b, so that a frictional force becomes larger and thus the tape 60 is difficult to come off. The contact portion 37c according to the embodiment has a sharp wedge shape, and is formed to easily bite into the tape 60.

The surface of the claw portion 37b on the main handle 11 side forms the inclined surface 37d. The inclined surface 37d is disposed to face the abutment portion 16d of the tape guide 16, and is provided to guide the abutment portion 16d of the tape guide 16 in contact therewith. Further, the V-shaped portion 37e is provided on the side opposite to the front end portion of the inclined surface 37d. The V-shaped portion 37e is configured such that the tape guide 16 sliding along the inclined surface 37d cannot further slide, and is formed to have an angle with respect to the inclined surface 37d.

In addition, the locked portion 37g and the rotation blocking portion 37i are provided on the peripheral surface 37f of the gripping member 37 on the opposite side of the main handle 11. The locked portion 37g and the rotation blocking portion 37i are formed using projections protrudingly formed on the peripheral surface 37f of the gripping member 37, and are configured to be engaged with the lock member 39 to be described below. The lock member 39 moves along the peripheral surface 37f of the gripping member 37, and can be engaged with the locked portion 37g or the rotation blocking portion 37i depending on circumstances.

The gripping member urging unit 38 is configured to urge the gripping member 37 toward the support portion 36. The gripping member urging unit 38 according to the embodiment is a torsion coil spring as illustrated in FIG. 7 and the like. When the gripping member urging unit 38 urges the gripping member 37 and thus the lock operation of the lock member 39 to be described below is released, the gripping member 37 operates, and the tape 60 can be gripped between the support portion 36 and the gripping member 37 from both sides thereof.

Figure 11A:
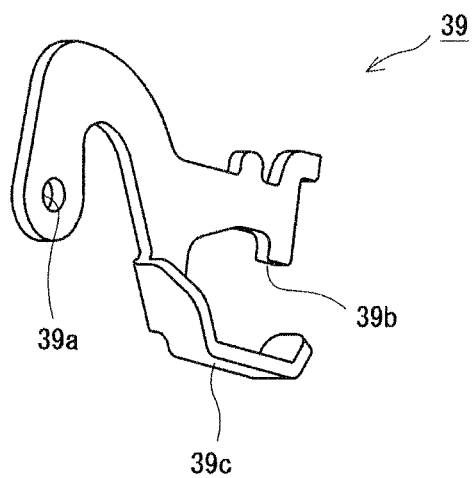
FIGS. 11A and 11B are a perspective view and a side view of a lock member, respectively.
Figure 11B:
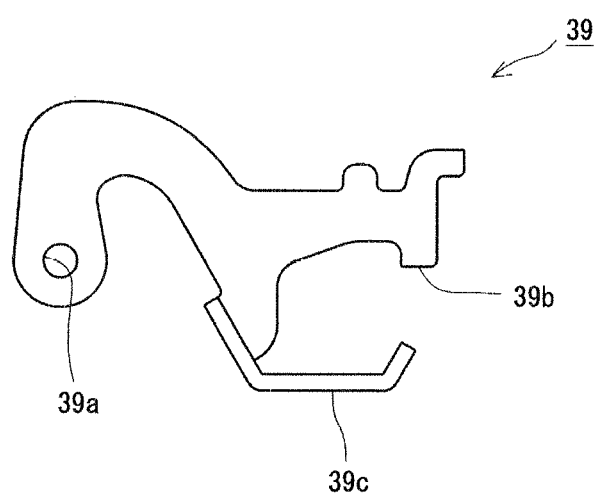

The lock member 39 is configured to hold the gripping member 37 at a standby position against an urging force of the gripping member urging unit 38 by being engaged with the gripping member 37. The lock member 39 includes a rotating shaft hole 39a, a locking portion 39b, and a pressed portion 39c as illustrated in FIGS. 11A and 11B.

The rotating shaft hole 39a is a hole through which the lock member rotating shaft 43 penetrates. The lock member rotating shaft 43 penetrates through the rotating shaft hole 39a, so that the lock member 39 is pivotally supported to be rotatable with respect to the clincher arm 30.

Figure 18:
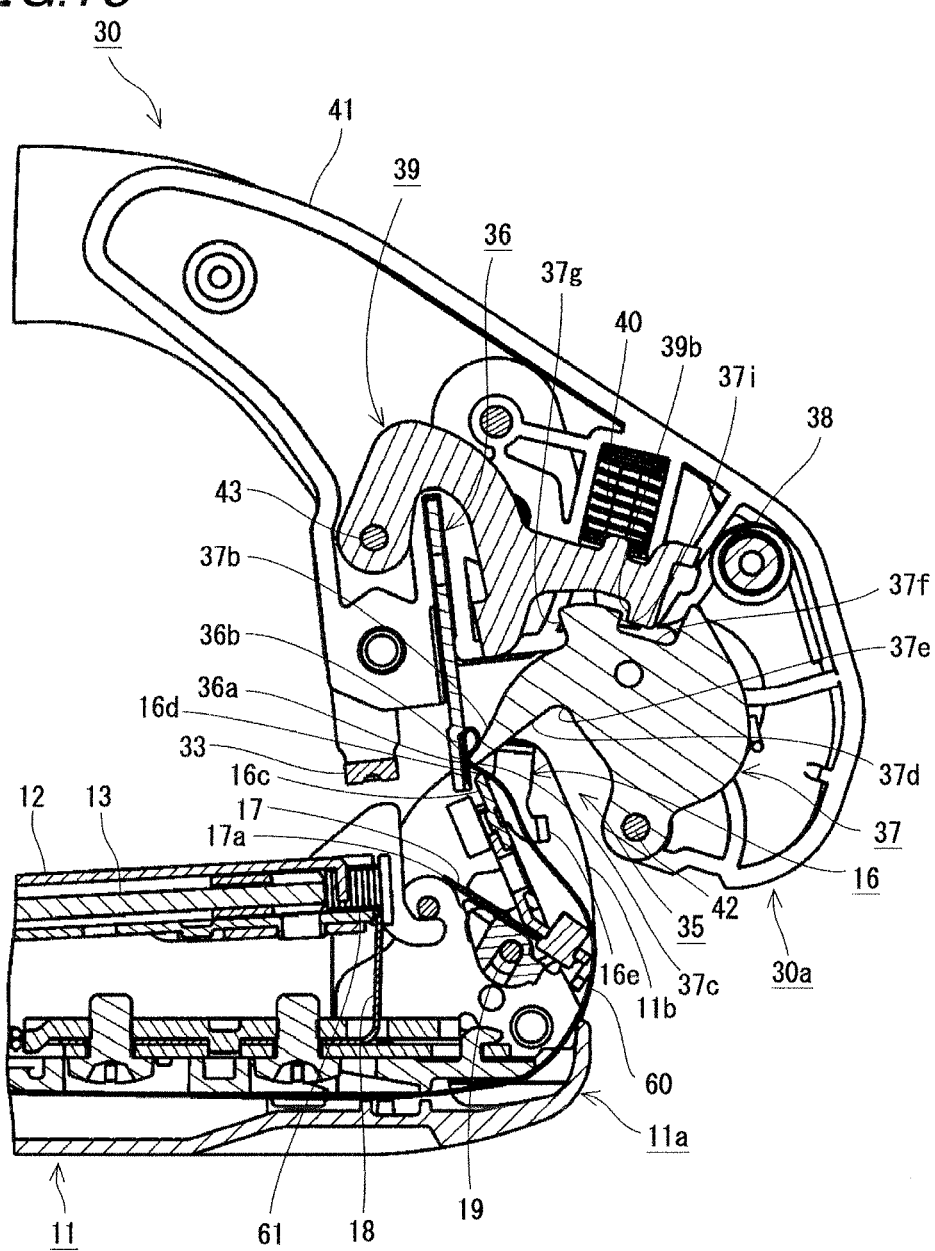
FIG. 18 is a partially enlarged sectional view of the binding machine for gardening and illustrates a state in which the gripping member grips a tape in accordance with the support portion.

The locking portion 39b is a portion for restricting movement of the gripping member 37, and is protrudingly formed to be engageable with the gripping member 37. As illustrated in FIG. 6 and the like, the locking portion 39b is disposed to face the peripheral surface 37f of the gripping member 37, and is engageable with the locked portion 37g and the rotation blocking portion 37i formed on the peripheral surface 37f. Specifically, the locking portion 39b is engaged with the locked portion 37g, so that the tape gripping device 35 can take a standby state of being opened without gripping the tape 60 as illustrated in FIG. 12. Then, when the lock member 39 rotates and thus the locking portion 39b is disengaged from the locked portion 37g, as illustrated in FIG. 18, the tape gripping device 35 can take a gripping state of being closed with the gripping of the tape 60. In the gripping state, the locking portion 39b faces the rotation blocking portion 37i so as to be engageable therewith, and thus the movement of the gripping member 37 is blocked. The rotation blocking portion 37i faces the locking portion 39b, so that the tape gripping device 35 maintains the gripping state until the lock member 39 rotates again.

The pressed portion 39c is a portion that is pushed up when the lock member 39 rocks, and is arranged so as to face the front end portion of the tape guide 16 as illustrated in FIG. 7 and the like. With this arrangement, the tape guide 16 pushes the lock member 39 against the urging force of the lock member urging unit 40 to be described below when the clincher arm 30 rotates in the closing direction with respect to the main handle 11.

The lock member urging unit 40 is configured to urge the lock member 39 in an engaging direction with the gripping member 37. The lock member urging unit 40 according to the embodiment is a compression spring as illustrated in FIG. 7 and the like. The lock member urging unit 40 urges the lock member 39, so that the locking portion 39b of the lock member 39 is constantly urged in an engaging direction with the locked portion 37g or the rotation blocking portion 37i.

The gripping device cover 41 is a cover that covers the tape gripping device 35 described above, and is fixed between two sheet metal members 30b of the clincher arm 30 as illustrated in FIGS. 12 and 13. The gripping device cover 41 according to the embodiment is constituted by split pieces that can be split in left and right directions, and accommodates the tape gripping device 35 therein. The gripping device cover 41 has an opening at a lower side, and the receiving portion 36a and the claw portion 37b of the tape gripping device 35 are disposed at the back of the opening. As illustrated in FIG. 12, the gripping device cover 41 includes a forward protruding portion 41a that covers the front side of the tape gripping device 35. Since the forward protruding portion 41a protrudes forward from the front end portion of the sheet metal member 30b, when the clincher arm 30 is inserted between crops, only the forward protruding portion 41a formed in a curved shape comes in contact with the crops, but the tape gripping device 35 does not come in contact with the crops.

As illustrated in FIGS. 2 to 5, the operation handle 50 includes a base member 51 fixed to the main body of the binding machine for gardening 10 and a cover member 55 detachable from the base member 51.

The base member 51 is a metal component acting directly on the main handle 11 and the clincher arm 30. The base member 51 is attached to the clincher arm 30 so as to be rotatable about a rotation fulcrum 51a as illustrated in FIGS. 4 and 5. Then, the base member 51 includes the link portion 52 engaged with the main handle 11 at one side thereof as viewed from the rotation fulcrum 51a and a handle support portion 53 at the other side thereof as viewed from the rotation fulcrum 51a. The handle support portion 53 is attached with the cover member 55, thereby functioning as a lever operation portion 55c.

The link portion 52 is engaged with the main handle 11 and serves as a point of application of a lever. A hook 52c is formed at the front end portion of the link portion 52, and the hook 52c is engaged with the roller-like engaging portion 14 of the main handle 11, whereby the clincher arm 30 maintains a state of being opened at a predetermined angle with respect to the main handle 11 as illustrated in FIG. 4.

From this state, when the operation handle 50 and the main handle 11 are gripped, as illustrated in FIG. 5, the hook 52c is disengaged from the roller-like engaging portion 14, and the roller-like engaging portion 14 slides on a sliding surface 52a formed on a front surface of the link portion 52. In this way, as the sliding surface 52a slides along the roller-like engaging portion 14, the clincher arm 30 rotates in the closing direction with respect to the main handle 11. An inclination of the sliding surface 52a used for the engagement of the roller-like engaging portion 14 changes stepwise in order to reduce an operation load when the staple 61 is ejected. That is, the inclination of the sliding surface 52a becomes larger at the time of the binding operation rather than at the time of the gripping operation, so that a larger force can be obtained at the time of the binding operation even with the same operation load. Thus, the binding operation requiring a large force can be also performed with a light operation load. In this way, since the inclination of the sliding surface 52a changes, a projection 52b is formed in a place where the inclination of the sliding surface 52a changes.

As illustrated in FIG. 2 and the like, the cover member 55 covers the base member 51 so as to prevent it from being exposed. All the contact portions or the operation portions with/of the outside of the operation handle 50 are covered with the cover member 55. The cover member 55 includes a hook cover 55a and a lever operation portion 55c.

The hook cover 55a covers the link portion 52 and a crossing portion X (see FIGS. 4 and 5) between the main handle 11 and the clincher arm 30. On the side surface of the hook cover 55a, a curved projection 55b is provided along the finger squeezing the lever operation portion 55c and the main handle 11 as illustrated in FIG. 1 and the like. When the curved projection 55b is provided, the operation handle 50 is easily gripped and can be held with a light grip even when the machine is held upward.

The lever operation portion 55c covers the handle support portion 53, and is gripped by an operator when the operation handle 50 is operated. When the lever operation portion 55c is gripped in a direction approaching the main handle 11, the base member 51 rotates about the rotation fulcrum 51a, and the link portion 52 acts on the main handle 11, whereby the main handle 11 and the clincher arm 30 rotate in the closing direction with respect to each other.

A method of using the binding machine for gardening 10 will be described below.

When the binding work is performed using the binding machine for gardening 10, first, the lock member 39 and the gripping member 37 are engaged with each other as illustrated in FIGS. 12 and 13, thereby setting the gripping member 37 to be in the standby state.

Figure 14:
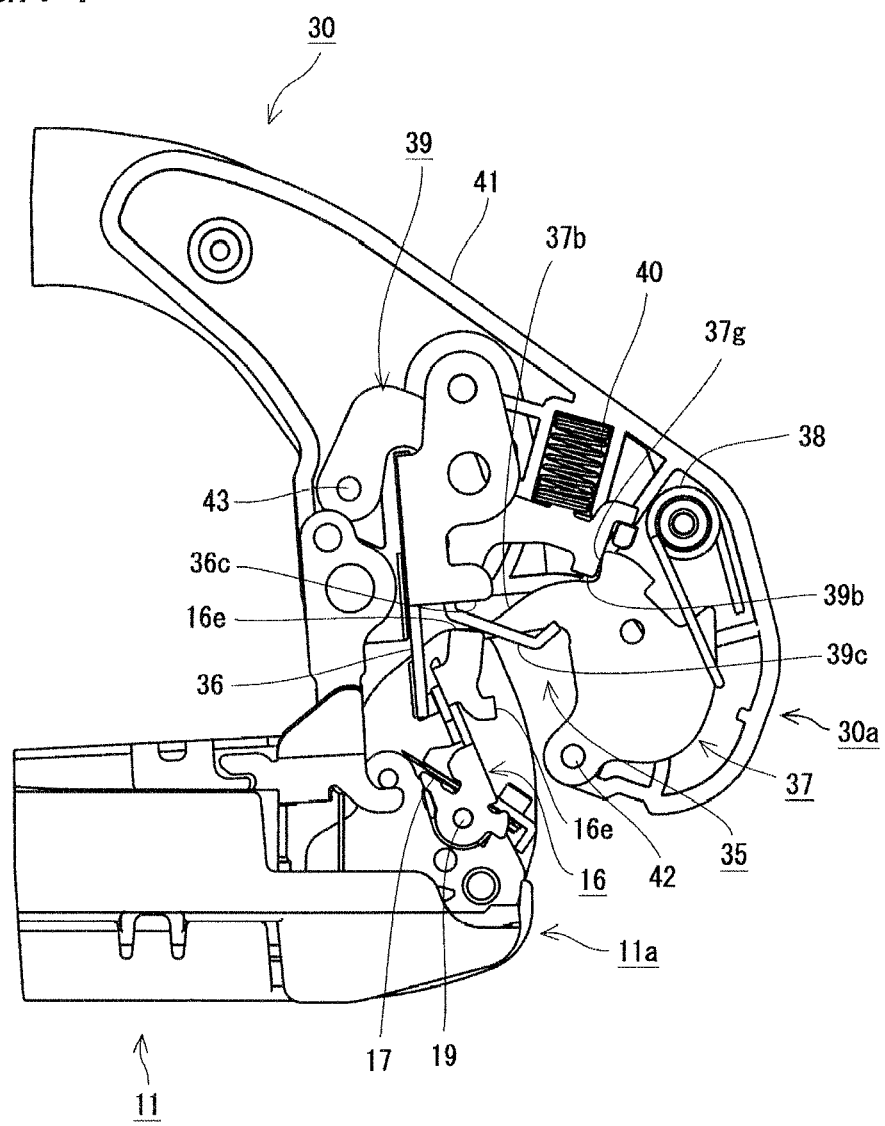
FIG. 14 is a view for explaining a relation between the tape guide and the lock member and the support portion and illustrates a state before the tape guide comes in contact with the lock member and the support portion.

In this state, when the handle is gripped and the clincher arm 30 rotates in the closing direction with respect to the main handle 11, the tape holding portion 16e of the tape guide 16 comes in contact with the pressed portion 39c of the lock member 39 as illustrated in FIG. 14.

Figure 15:
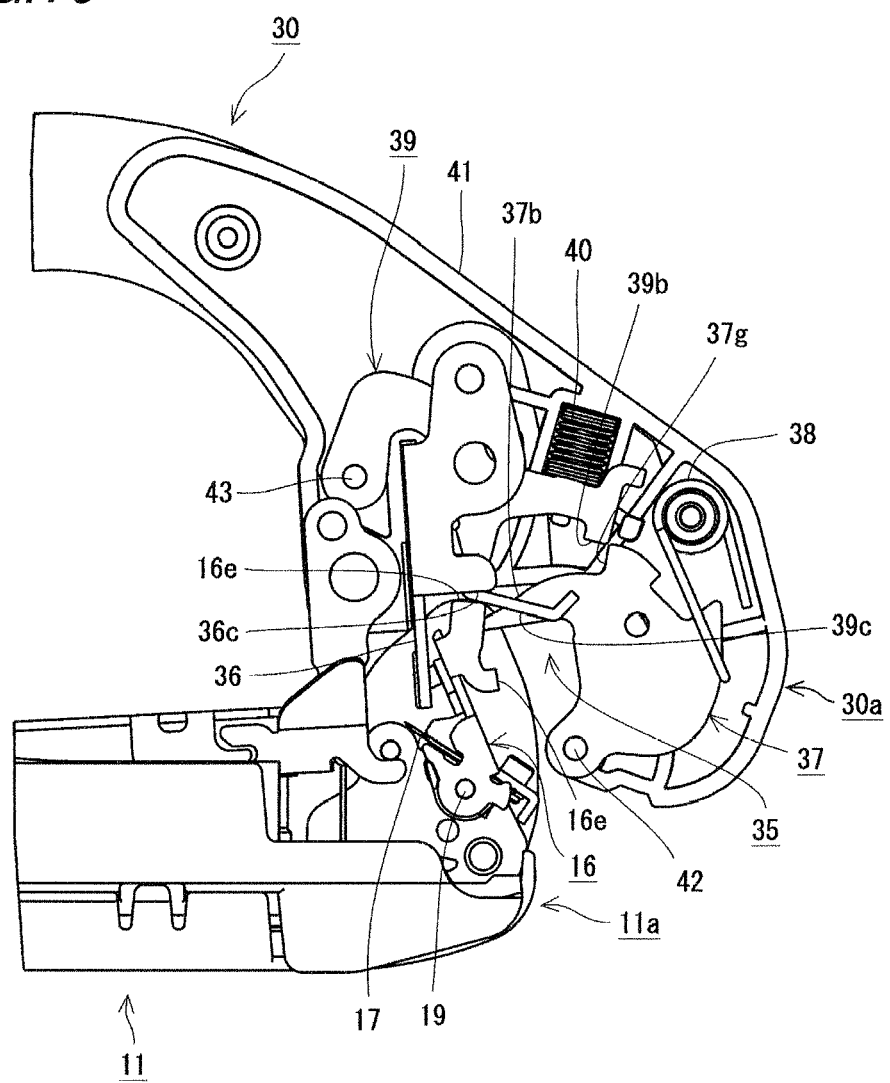
FIG. 15 is a view for explaining the relation between the tape guide and the lock member and the support portion and illustrates a state in which the tape guide pushes up the lock member.

When the clincher arm 30 further rotates, the lock member 39 is pushed up to rotate as illustrated in FIG. 15. As the lock member 39 rotates, the locking portion 39b of the lock member 39 is disengaged from the locked portion 37g of the gripping member 37 and the gripping member 37 rotates. Thus, the claw portion 37b of the gripping member 37 is pressed against the back surface portion 16c of the tape guide 16, and the end 60a of the tape 60 drawn out from the tape guide 16 is gripped in the guide path of the tape guide 16.

Figure 16:
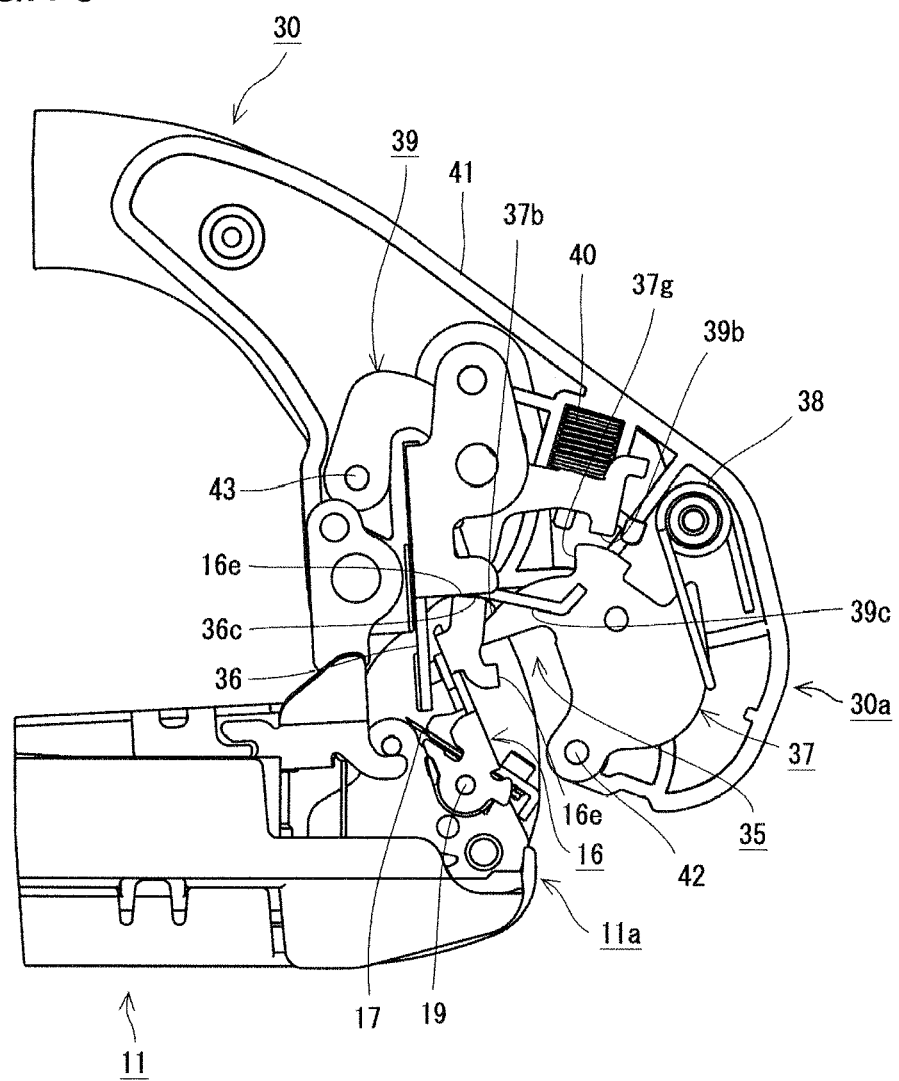
FIG. 16 is a view for explaining the relation between the tape guide and the lock member and the support portion and illustrates a state in which the tape guide abuts on the support portion.

At this time, when the clincher arm 30 further rotates, the tape holding portion 16e of the tape guide 16 comes in contact with the movement restricting portion 36c of the support portion 36 as illustrated in FIG. 16. In this way, the tape guide 16 functions as a movement restricting unit for restricting the rotation of the clincher arm 30 in the embodiment. Thus, the rotation of the clincher arm 30 is restricted, and thus the clincher arm 30 can hardly rotate up to a completely closed state (a closed state in which the binding operation is executed). Whether the tape guide 16 restricts the rotation of the clincher arm 30 is automatically switched according to the state of the tape gripping device 35. That is, when the tape gripping device 35 is in the standby state, the rotation of the clincher arm 30 is restricted as described above, but when the tape gripping device 35 is in the gripping state, the tape guide 16 acts on the tape gripping device 35 (which will be described below in detail), and thus the clincher arm 30 moves up to a position where the rotation thereof is not restricted (see FIG. 21).

Figure 17:
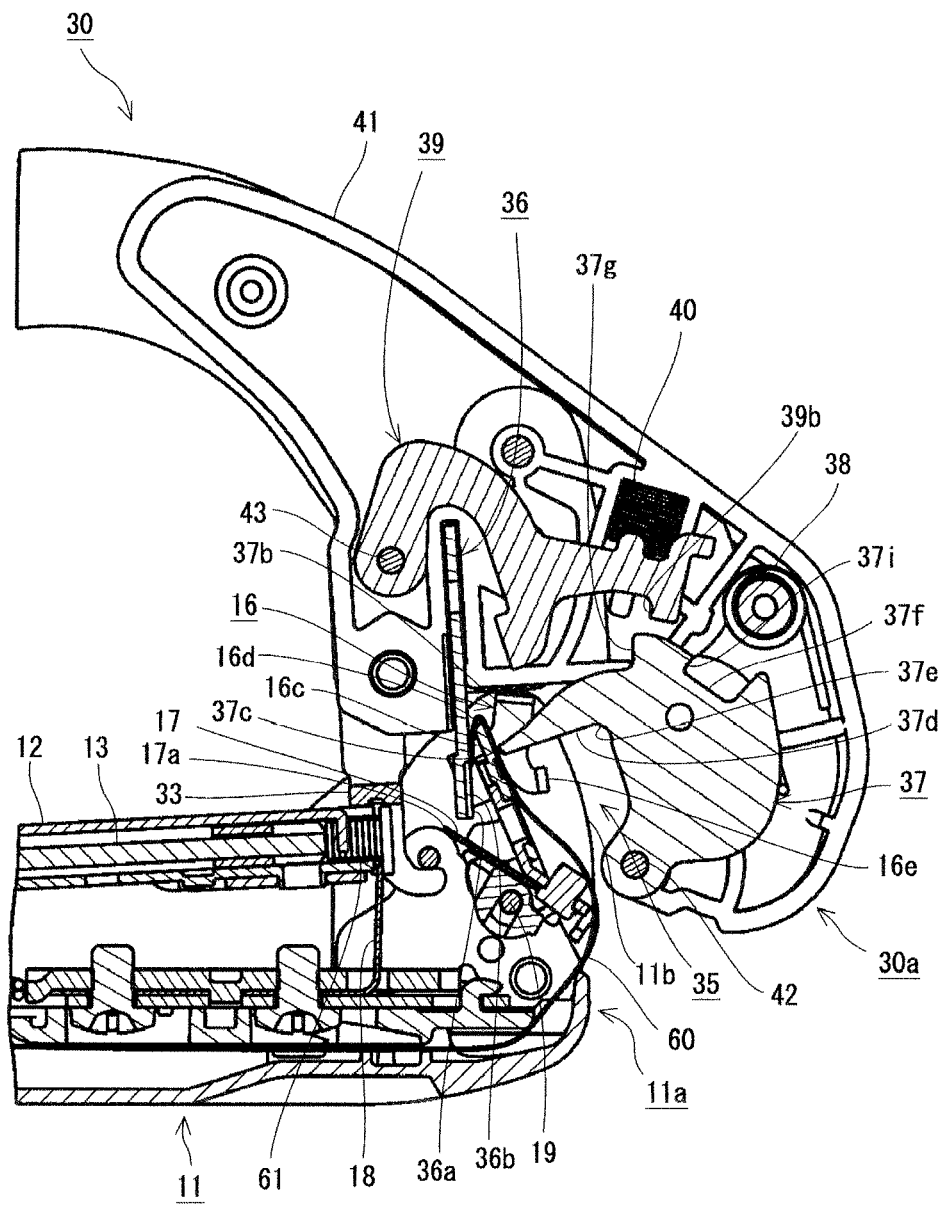
FIG. 17 is a partially enlarged sectional view of the binding machine for gardening and illustrates a state in which the gripping member grips a tape in accordance with the tape guide.

When the first squeezing operation is performed in this way, as illustrated in FIG. 17, the gripping member 37 enters into the guide path of the tape guide 16 and grips the tape 60 in the guide path in accordance with the back surface portion 16c of the tape guide 16. In this state, when the squeezing of the handle is released and the clincher arm 30 rotates in the opening direction with respect to the main handle 11, as illustrated in FIG. 18, the gripping member 37 slides and passes in the guide path in a state of gripping the tape 60 and grips the tape 60 in accordance with the support portion 36 after passing through the guide path.

Further, when the clincher arm 30 rotates in the opening direction with respect to the main handle 11, as illustrated in FIG. 19, the front end portion 30a of the clincher arm 30 and the front end portion 11a of the main handle 11 are separated from each other in a state of gripping the tape 60, and the tape 60 is in a state of being stretched between the clincher arm 30 and the main handle 11.

Figure 20:
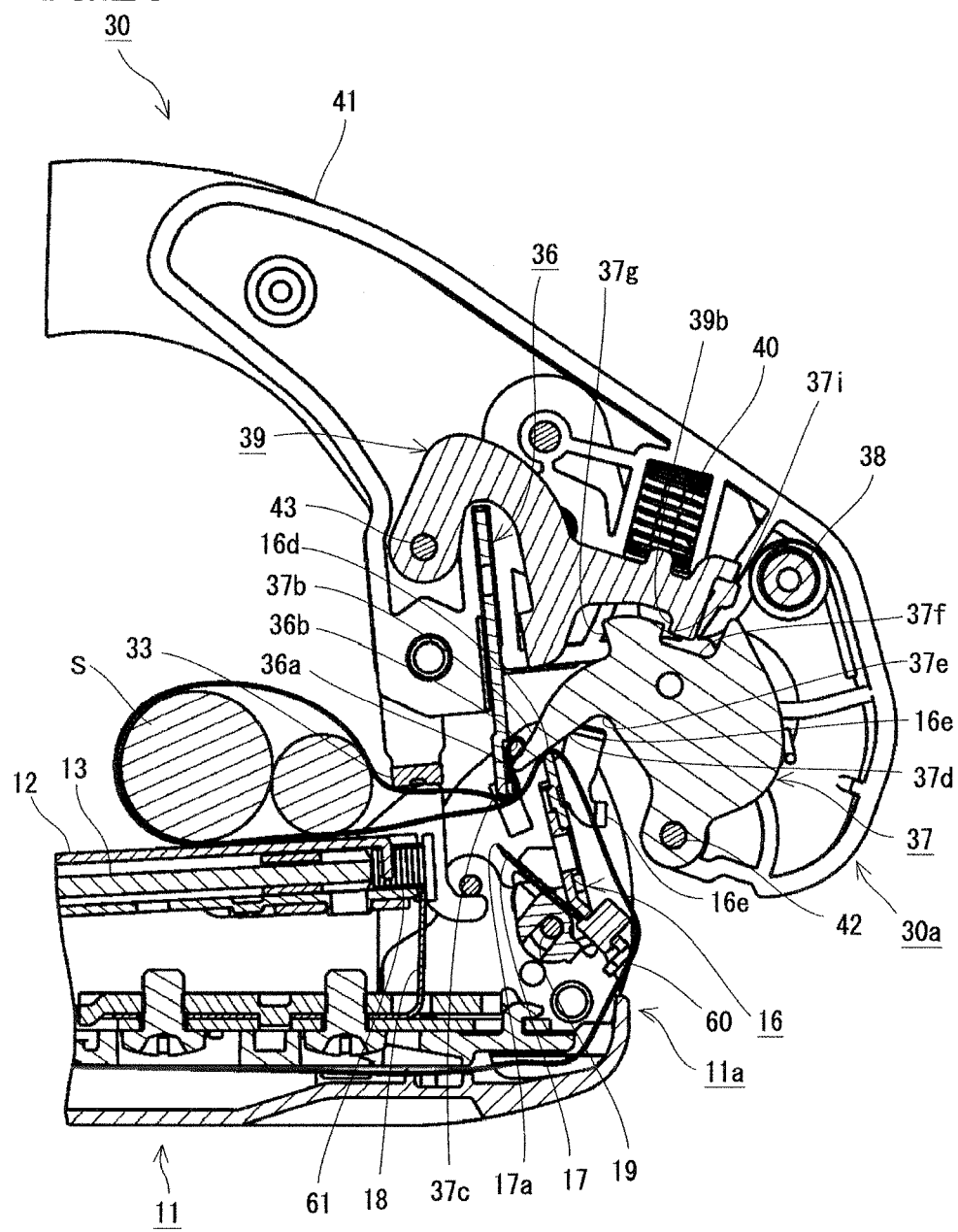
FIG. 20 is a partially enlarged sectional view of the binding machine for gardening and illustrates a state in which the tape guide is in contact with the gripping member.

In this state, when the objects S to be bound such as seedlings or branches are introduced from the outside of the stretched tape 60 and the clincher arm 30 rotates in the closing direction, as illustrated in FIG. 20, a tape loop is formed to bind the objects S to be bound.

From the state illustrated in FIG. 20, when the handle is further gripped and the clincher arm 30 rotates in the closing direction with respect to the main handle 11, the abutment portion 16d of the tape guide 16 abuts on the inclined surface 37d of the gripping member 37, and the abutment portion 16d is guided to the inclined surface 37d of the gripping member 37 and moves forward. As the tape magazine 20 moves forward as described above, the tape guide 16 is retracted to a position where the tape holding portion 16e does not come in contact with the movement restricting portion 36c of the support portion 36. When the tape guide 16 is retracted, the restriction of the rotation of the clincher arm 30 due to the tape guide 16 is released, and the clincher arm 30 is rotatable up to a completely closed state (a closed state where the binding operation is executed). In a state where the tape magazine 20 starts to move, the locking portion 39b of the lock member 39 faces the rotation blocking portion 37i of the gripping member 37, and the movement of the gripping member 37 is restricted.

Figure 21:
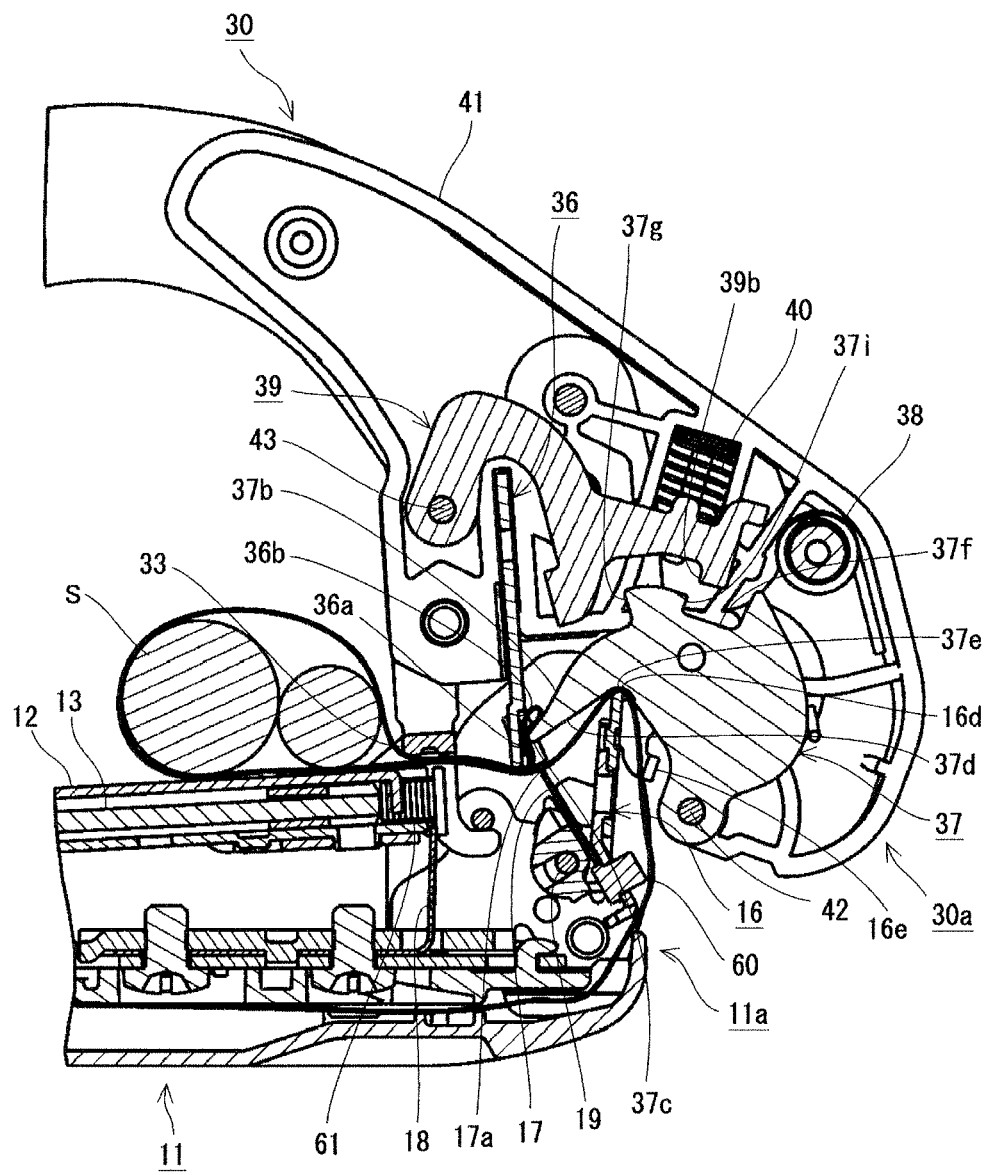
FIG. 21 is a partially enlarged sectional view of the binding machine for gardening and illustrates a state in which the tape guide moves along an inclined surface of the gripping member.

Then, as illustrated in FIG. 21, the tape magazine 20 rocks forward until the abutment portion 16d is engaged with the V-shaped portion 37e ahead of the inclined surface 37d. When the abutment portion 16d is engaged with the V-shaped portion 37e in this way, the tape guide 16 and the gripping member 37 hold the tape 60 in accordance with each other. Immediately before the abutment portion 16d is engaged with the V-shaped portion 37e, the tape holding portion 16e of the tape magazine 20 pushes up the pressed portion 39c of the lock member 39 to rock the lock member 39. Thus, the movement restriction of the gripping member 37 is released.

From the state illustrated in FIG. 21, when the handle is further gripped and the clincher arm 30 rotates in the closing direction with respect to the main handle 11, as illustrated in FIG. 22, the tape magazine 20 and the gripping member 37 collapse forward together. At this time, since the tape magazine 20 moves while holding the tape 60, tension is applied to the tape 60. As the gripping member 37 moves together with the tape magazine 20, the tape 60 is detached from the tape gripping device 35. However, since the detached tape 60 is pressed from below by the tensioned tape 60, it is not disengaged from the front end portion 30a of the clincher arm 30. Then, as the tape magazine 20 rocks, the cutting blade 17 fixed to the tape magazine 20 rocks in a direction in which the cutting blade 17 approaches the tape 60, and the tensioned tape 60 is cut. At the same time, the staple 61 is ejected behind the cutting blade 17 by the staple driver 18.

As illustrated in FIG. 22, in the course of rotating the clincher arm 30 in the closing direction with respect to the main handle 11, the tape holding portion 16e of the tape magazine 20 is disengaged from the pressed portion 39c of the lock member 39. For this reason, the force pushing up the lock member 39 disappears, so that the lock member 39 moves by the urging force of the lock member urging unit 40, and becomes engageable with the gripping member 37.

In addition, the gripping member 37 moves together with the tape magazine 20, and thus moves to the front side compared to the standby state.

Finally, when the squeezing of the handle is released and the clincher arm 30 rotates in the opening direction with respect to the main handle 11, as illustrated in FIG. 12, the gripping member 37 is engaged with the lock member 39 and the tape gripping device 35 is in a standby state. In this way, the binding machine for gardening 10 returns to the initial state, and the first binding work is completed.

By the way, the tape gripping device 35 according to the embodiment is configured such that a force is applied on the tape 60 in the pulling-out direction in the state where the tape 60 is gripped by the tape gripping device 35, and when the force to rotate the gripping member 37 is generated when the tape 60 is pulled out, the force to rotate the gripping member 37 acts in the engaging direction with the support portion 36. That is, as illustrated in FIG. 18 and the like, the gripping member rotating shaft 42 is provided on an upstream side in the drawing direction of the tape 60, with respect to the contact portion between the gripping member 37 and the support portion 36. With this arrangement, when the force to pull out the tape 60 is applied, the gripping member 37 rotates in a direction in which it bites into the tape 60, and thus the pullout of the tape 60 can be prevented.

As described above, according to the embodiment, the tape gripping device 35 includes the support portion 36 attached to the clincher arm 30 and the gripping member 37 provided to face the support portion 36, and thus the tape 60 can be sandwiched and gripped between the support portion 36 and the gripping member 37 from both sides thereof. Since this configuration does not have a structure in which a claw is thrust into the tape 60 and the tape 60 is gripped, there is no problem that the tape 60 is torn when the claw is thrust into a thin tape 60 or the claw is not thrust into a thick tape 60. Therefore, the binding work can be performed using the thin tape 60 or the thick tape 60 which could not be used in the past, and can be performed even at a low or high temperature at which the tape 60 can hardly be held well.

Further, the force is applied on the tape 60 in the pulling-out direction in the state where the tape 60 is gripped by the tape gripping device 35, and when the force to rotate the gripping member 37 is generated when the tape 60 is pulled out, the force to rotate the gripping member 37 acts in the engaging direction with the support portion 36. According to this configuration, the gripping member 37 rotates in the engaging direction (a direction in which the sandwiching becomes strong) with the support portion 36 by being pulled due to the friction of the gripping member 37 and the surface of the tape 60 even when the tape 60 is pulled in the pulling-out direction, whereby the pullout of the gripped tape 60 can be prevented.

According to this configuration, since the gripping member rotating shaft 42 can be disposed on the front end portion side of the clincher arm 30, the height of the tape gripping device 35 (the width coming in contact with the crop when the machine is inserted into the gap between the crops) can be made small. Thus, when the machine is inserted into the gap between the crops or the machine is pulled out from the space between the crops, the machine hardly comes in contact with the crops, and thus workability thereof can be improved.

Moreover, since the claw portion 37b of the gripping member 37 is directed inward so as not to protrude toward the opening, it is also possible to make it hard to cause the problem that the claw portion 37b comes in contact with the crop to damage the crop when the crop is inserted between the main handle 11 and the clincher arm 30.

The tape guide 16 is formed with the slit 16b which can allow the gripping member 37 to enter into the guide path. According to this configuration, it is possible to reliably grip the tape 60 without increasing a operation stroke of the gripping member 37. In the related art, since the front end portion of the tape 60 outside the guide path is gripped, there is a possibility that the front end portion of the tape 60 can hardly be gripped well due to the reason that the front end portion of the tape 60 hangs down. In this regard, according to the invention, since the gripping member 37 enters into the guide path from the slit 16b and can grip the tape 60 in the guide path, it is possible to grip the tape 60 supported by the guide path, and to reliably grip the tape 60.

In addition, the gripping member 37 grips the tape 60 in accordance with the tape guide 16 in the guide path, slides and passes in the guide path in the state of gripping the tape 60, and grips the tape 60 in accordance with the support portion 36 after passing through the guide path. That is, the gripping member 37 grips the tape 60 in two steps, for example, first, the gripping member 37 grips the tape 60 in accordance with the tape guide 16 in the guide path, and then grips the tape 60 in accordance with the support portion 36. According to this configuration, it is possible to prevent the tape 60 from being detached from the guide path. Specifically, a structure can also be provided in which the slit 16b is provided on both sides in the guide path, and the gripping member 37 grips the tape 60 in accordance with the support portion 36 in the guide path. However, in this way, the tape 60 pressed toward the support portion 36 may be torn due to the friction with the edge of the slit 16b provided on the side of the support portion 36, or the tape 60 pressed toward the support portion 36 may slip off from the slit 16b provided on the side of the support portion 36 (detached from the guide path). When the tape 60 is detached from the guide path, troubles may be caused in the subsequent gripping operation. In this regard, when the tape 60 is gripped in two steps, it is possible to prevent the tape 60 from being torn due to the friction with the edge of the slit 16b, or to prevent the tape 60 from being detached from the guide path.

In addition, the support portion 36 and the gripping member 37 include the concave-convex members that are engaged with each other, and the tape 60 can be gripped by the concave-convex members. According to this configuration, when the tape 60 is gripped by the concave-convex members, the friction occurs between the edges of the concave-convex members and the surface of the tape 60, and thus the force to hold the tape 60 can be enhanced. Further, the tape 60 is deformed by the concave-convex members to increase the contact area, and thus the frictional force (holding force) is enhanced. Accordingly, it is also possible to enhance the force to hold the slippery tape 60.

In this way, it is possible to prevent an operational failure by preventing the pullout of the tape 60 even when the spring force of the gripping member urging unit 38 is reduced. If the spring force of the gripping member urging unit 38 can be reduced, the operation load is reduced, and thus operability is improved.

In addition, if the spring force can be reduced, since the gripping member urging unit 38 itself can be made small, the height of the tape gripping device 35 can be made low, and workability can be further improved.

Further, the clincher arm 30 is provided with the tape gripping device 35 at the front end portion of the curved arm portion 32. According to this configuration, due to the synergistic effect of the small-sized tape gripping device 35 and the curved arm portion 32, the front end portion of the machine is easily inserted into the object S to be bound, and thus operability is improved.

In the embodiment described above, the groove is formed in the support portion 36, thereby forming the recessed portion 36b, but is not limited thereto. The support portion 36 and the gripping member 37 may be provided with the concave-convex members which are engaged with each other. For example, as illustrated in FIG. 23, a protrusion 36e may be formed on the support portion 36, and the recessed portion 36b may be formed in the protrusion 36e. Further, a projection may be formed on the support portion 36, and a recessed portion may be formed in the gripping member 37.

In the embodiment described above, the contact portion 37c of the gripping member 37 is formed in the sharp shape, but is not limited to such a shape. For example, as illustrated in FIGS. 24A and 24B, the contact portion 37c may be subjected to a process of raising the coefficient of friction (for example, knurling) to prevent the pullout of the tape 60. In this way, when the engaging portion of the gripping member 37 with the support portion 36 has the concave-convex member (when the gripping member 37 includes the concave-convex member 37c at the engaging portion where the gripping member 37 engages with the support portion 36), the coefficient of friction increases due to the concave-convex member 37c (with protruding portions and recessed portions), and thus the force to hold the tape 60 can be enhanced. Further, the claw portion 37b of the gripping member 37 is made using an elastic member, so that the frictional force with the surface of the tape 60 may be increased and the pullout of the tape 60 may be prevented. In this way, if the engaging portion of the gripping member 37 with the support portion 36 is formed of the elastic member, a large friction is generated between the elastic member and the surface of the tape 60, and thus the force to hold the tape 60 can be increased.

In addition, claws may be provided in the gripping member 37 or the support portion 36, or both of the gripping member 37 and the support portion 36 to bite into when the tape 60 is pulled in the pulling-out direction, thereby preventing the pullout of the tape 60.

Further, when the tape 60 is pulled out in the pulling-out direction, the gripping member 37 and the support portion 36 may be formed to approach each other. For example, when the gripping member 37 is formed of a block slidable along an inclined surface and the inclined surface for guiding the sliding of the gripping member 37 is inclined along the pulling-out direction of the tape 60, the gripping member 37 can approach toward the support portion 36 at the time of the sliding thereof. As long as the same wedge effect can be obtained, the tape may be sandwiched by not only a configuration in which one is fixed and the other is movable but also a configuration in which both components are movable.

In the embodiment described above, the gripping member 37 is rotatable, but another type of gripping member 37 may be used. For example, an elastically deformable gripping member 37 (a gripping member 37 formed of, for example, rubber) may be fixed to the clincher arm 30 so as not to have the gripping member rotating shaft 42. Further, a one-way roller or a gear, which can hardly rotate in the pulling-out direction of the tape 60, may be provided in the gripping member 37 or the support portion 36, or both of the gripping member 37 and the support portion 36, and the tape 60 may be gripped by the roller or the gear.

Although not particularly illustrated in the drawings, if the front end portion of the tape 60 is gripped by being folded back to be doubled, the strength of the tape 60 to be held can be increased, and thus the holdable load can be increased.

(1) A binding machine for gardening comprising:
a main handle that is configured to draw out a tape;
a clincher arm that is provided such that an end portion side of the clincher arm is configured to be close to and be away from a tape guide; and
a tape gripping device that is attached to the clincher arm and that is configured to grip the tape drawn out from the main handle, wherein
the tape gripping device includes:
a support portion that is provided on the clincher arm; and
a gripping member that is provided so as to face the support portion, and
the tape gripping device is configured to sandwich and grip the tape by the support portion and the gripping member.

(2) The binding machine for gardening according to (1), wherein
the gripping member is rotatably attached to the clincher arm,
a force is applied on the tape in a pulling-out direction in the state where the tape is gripped by the tape gripping device, and
in a case where a force to rotate the gripping member is generated when the tape is pulled out, the force to rotate the gripping member is configured to be applied in an engaging direction with the support portion.

(3) The binding machine for gardening according to (1) or (2), wherein
a front end portion of the main handle is provided with a tape guide including a guide path through which the tape is guided so as to be drawable, and
the tape guide is formed with a slit which allows the gripping member to enter into the guide path.

(4) The binding machine for gardening according to (3), wherein
the gripping member is configured to grip the tape in accordance with the tape guide in the guide path, to pass in the guide path in a state where the griping member grips the tape, and to grip the tape in accordance with the support portion after passing through the guide path.

(5) The binding machine for gardening according to any one of (1) to (4), wherein
one of the support portion and the gripping member includes at least one concave member and the other of the support portion and the gripping member includes at least one convex member, the at least one concave member is engaged with the at least one convex member, and the at least one concave member and the at least one convex member are configured to grip the tape.

(6) The binding machine for gardening according to any one of (1) to (5), wherein
the gripping member includes a concave-convex member at an engaging portion where the gripping member engages with the support portion.

(7) The binding machine for gardening according to any one of (1) to (6), wherein
the engaging portion where the gripping member engages with the support portion is formed of an elastic member.

(8) The binding machine for gardening according to any one of (1) to (7), wherein
the clincher arm is provided with the tape gripping device at a front end portion of a curved arm portion.

(9) The binding machine for gardening according to any one of (1) to (8), wherein
the gripping member is configured to be rotatably attached to the clincher arm, and a rotating shaft of the gripping member is provided on an upstream side in a drawing direction of the tape with respect to a contact portion between the gripping member and the support portion.

(10) The binding machine for gardening according to any one of (1) to (9), wherein
the tape gripping device is configured to grip the tape held by the tape guide when the end portion side of the clincher arm is close to the tape guide at a first position,
the tape gripping device includes:
the support portion that is configured to move to a position which faces one surface of the tape held by the tape guide when the end portion side of the clincher arm is close to the tape guide at a second position which is away from the tape guide than the first position; and
the gripping member that is configured to move to a position which faces the support portion through the tape to be in contact with the tape when the end portion side of the clincher arm is close to the tape guide at the first position, and configured to grip the tape with the support portion.

(11) The binding machine for gardening according to any one of (1) to (10), wherein
the clincher arm is rotatably attached to the main handle such that the end portion side of the clincher arm is configured to be close to and be away from the tape guide.

(12) The binding machine for gardening according to any one of (1) to (11), wherein
the support portion includes a plate-like receiving portion which is fixed to the clincher arm along a drawing direction of the tape and which is configured to support one surface of the tape.

(13) The binding machine for gardening according to (12), wherein
the receiving portion includes a recessed portion which is configured to be in contact with the support portion through the tape.

(14) The binding machine for gardening according to (13), wherein
the recessed portion is a groove which width is narrower than the tape and wider than an end portion of the support portion.

(15) The binding machine for gardening according to any one of (12) to (14), wherein
the receiving portion includes a movement restricting portion which is protrudingly formed on both sides of the receiving portion and which is configured to restrict rotation of the clincher arm by being in contact with the tape guide.

(16) The binding machine for gardening according to any one of (1) to (15), wherein
the gripping portion is pivotally supported to be rotatable with respect to the clincher arm.

(17) The binding machine for gardening according to any one of (13) to (16), wherein
the gripping portion includes a claw portion which is configured to enter into the recessed portion through the tape and configured to grip the tape when the end portion side of the clincher arm is close to the tape guide at the first position.

(18) The binding machine for gardening according to any one of (1) to (17), wherein
the tape gripping device includes:
a gripping member urging unit which is configured to urge the gripping member toward the support portion; and a lock member which is configured to hold the gripping member at a standby position against an urging force of the gripping member urging unit by being engaged with the gripping member, when a lock operation of the lock member is released, the gripping member operates, and the tape is gripped between the support portion and the gripping member from both sides of the tape.

What is claimed is:

1. A binding machine for gardening comprising:
a main handle which includes a tape guide, wherein tape is drawn from the main handle through the tape guide;
a clincher arm which is movably mounted with respect to the main handle such that an end portion of the clincher arm is moved toward and away from the tape guide; and
a tape gripping device that is attached to the clincher arm and that is configured to grip the tape drawn from the tape guide of the main handle, wherein
the tape gripping device includes:
a support portion that is provided on the clincher arm; and
a gripping member that is provided so as to face the support portion, and
the tape gripping device is configured to sandwich and grip the tape by the support portion and the gripping member,
wherein the gripping member is rotatably attached to the clincher arm, and
a rotating shaft of the gripping member is provided on an upstream side, in a direction in which the clincher arm draws the tape from the main handle, with respect to a contact portion between the gripping member and the support portion,
wherein the gripping member is pivotally supported on the rotating shaft.

2. The binding machine for gardening according to claim 1, wherein
the gripping member is rotatable toward and away from the support portion between a gripping state and a non-gripping state,
when the gripping member is in the gripping state, the clincher arm is moved away from the main handle to pull tape from the tape guide of the main handle, and
when the tape is pulled from the tape guide, the gripping member is urged toward the support portion to grip the tape between the gripping member and the support portion.

3. The binding machine according to claim 2, wherein the tape gripping device includes a gripping member urging unit which urges the gripping member toward the support portion, and wherein the gripping member urging unit comprises a spring.

4. The binding machine according to claim 3, wherein the rotating shaft of the gripping member is provided at a bottom portion of the gripping member, and the spring is provided at a top portion of the gripping member.

5. The binding machine for gardening according to claim 1, wherein
the tape guide is located at a front end portion of the main handle, and the tape guide includes a guide path through which the tape is guided, and
the tape guide includes a slit which allows the gripping member to enter into the guide path.

6. The binding machine for gardening according to claim 5, wherein
the gripping member is configured to grip the tape located in the guide path of the tape guide, to pass in the guide path, and to grip the tape against the support portion after passing through the guide path.

7. The binding machine for gardening according to claim 1, wherein
one of the support portion and the gripping member includes at least one concave member and the other of the support portion and the gripping member includes at least one convex member, the at least one concave member is engaged with the at least one convex member, and the at least one concave member and the at least one convex member are configured to grip the tape.

8. The binding machine for gardening according to claim 1, wherein
the gripping member includes a concave-convex member with protruding portions and recessed portions at an engaging portion where the gripping member engages with the support portion.

9. The binding machine for gardening according to claim 8, wherein
the engaging portion where the gripping member engages with the support portion is formed of an elastic member.

10. The binding machine for gardening according to claim 1, wherein
the clincher arm includes a curved arm portion, and the tape gripping device is located at a front end portion of the curved arm portion.

* * * * *

UNITED STATES PATENT AND TRADEMARK OFFICE
CERTIFICATE OF CORRECTION

PATENT NO. : 10,717,555 B2  
APPLICATION NO. : 15/622188  
DATED : July 21, 2020  
INVENTOR(S) : Hiroki Ishiguro et al.

Page 1 of 1

It is certified that error appears in the above-identified patent and that said Letters Patent is hereby corrected as shown below:

In the Specification

Column 15, Line 17, "the tape magazine 20" should read -- the tape guide 16 --.
Column 15, Line 26, "the tape magazine 20" should read -- the tape guide 16 --.
Column 15, Line 30, "the tape magazine 20" should read -- the tape guide 16 --.
Column 15, Line 38, "the tape magazine 20" should read -- the tape guide 16 --.
Column 15, Line 45, "the tape magazine 20" should read -- the tape guide 16 --.
Column 15, Lines 46-47, "the tape magazine 20" should read -- the tape guide 16 --.
Column 15, Line 49, "the tape magazine 20" should read -- the tape guide 16 --.
Column 15, Line 53, "the tape magazine 20" should read -- the tape guide 16 --.
Column 15, Line 54, "the tape magazine 20" should read -- the tape guide 16 --.
Column 15, Lines 61-62, "the tape magazine 20" should read -- the tape guide 16 --.
Column 16, Lines 1-2, "the tape magazine 20" should read -- the tape guide 16 --.

Signed and Sealed this  
Twentieth Day of April, 2021

Drew Hirshfeld  
*Performing the Functions and Duties of the*  
*Under Secretary of Commerce for Intellectual Property and*  
*Director of the United States Patent and Trademark Office*